United States Patent
Malik

(10) Patent No.: US 8,335,379 B2
(45) Date of Patent: Dec. 18, 2012

(54) SYSTEM AND METHOD FOR CLEANUP OF MRC IMAGES FOR IMPROVED COMPRESSION AND IMAGE QUALITY

(75) Inventor: Amal Z. Malik, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 528 days.

(21) Appl. No.: 12/647,838

(22) Filed: Dec. 28, 2009

(65) Prior Publication Data

US 2011/0158529 A1   Jun. 30, 2011

(51) Int. Cl.
G06K 9/34 (2006.01)
(52) U.S. Cl. ........................... 382/173; 382/274
(58) Field of Classification Search .................. 382/173, 382/176, 274
See application file for complete search history.

(56) References Cited

U.S. PATENT DOCUMENTS

| | | | |
|---|---|---|---|
| 6,198,845 B1 | 3/2001 | Tse et al. | |
| 6,324,305 B1* | 11/2001 | Holladay et al. | 382/239 |
| 6,373,981 B1* | 4/2002 | de Queiroz et al. | 382/176 |
| 6,400,844 B1* | 6/2002 | Fan et al. | 382/173 |
| 6,674,899 B2 | 1/2004 | Nagarajan et al. | |
| 7,058,222 B2 | 6/2006 | Li et al. | |
| 7,236,641 B2 | 6/2007 | Curry et al. | |
| 7,242,802 B2 | 7/2007 | Curry et al. | |
| 7,308,136 B2* | 12/2007 | Curry et al. | 382/164 |
| 7,324,120 B2 | 1/2008 | Curry et al. | |
| 7,343,046 B2 | 3/2008 | Curry et al. | |
| 7,356,183 B2* | 4/2008 | Curry et al. | 382/173 |
| 7,376,272 B2 | 5/2008 | Fan et al. | |
| 7,403,661 B2 | 7/2008 | Curry et al. | |
| 7,729,546 B2* | 6/2010 | Ahmed et al. | 382/232 |
| 2004/0052421 A1* | 3/2004 | Curry et al. | 382/243 |
| 2007/0253620 A1 | 11/2007 | Nagarajan et al. | |
| 2008/0122877 A1* | 5/2008 | Aoyama | 345/698 |
| 2008/0292130 A1 | 11/2008 | Nafarieh et al. | |
| 2010/0142806 A1* | 6/2010 | Malik et al. | 382/164 |

OTHER PUBLICATIONS

Gonzalez, et al., Digital Image Processing, reprinted in 1993, pp. 518-564, Addison-Wesley Publishing.
Amal Malik, U.S. Appl. No. 12/329,078, filed Dec. 5, 2008.
Amal Malik, U.S. Appl. No. 12/328,973, filed Dec. 5, 2008.
Amal Malik, U.S. Appl. No. 12/564,520, filed Sep. 22, 2009.

* cited by examiner

*Primary Examiner* — Jingge Wu
(74) *Attorney, Agent, or Firm* — Pillsbury Winthrop Shaw Pittman, LLP

(57) ABSTRACT

A method, system, and product for separating an image into a set of layers (background, foreground, and selector) and processing those layers to produce an output image of reduced size with improved compression and greater image quality. Each pixel of image data is processed based on signals produced from the set of layers and their attributes. The method includes determining values for signals being processed based on a look-up table or template, as well as changing values based on each pixel and its neighboring pixels.

34 Claims, 14 Drawing Sheets
(5 of 14 Drawing Sheet(s) Filed in Color)

| SST SIGNAL | SEL SIGNAL | SELECTOR COUNT | SEE SIGNAL | NEW SEL VALUE | NEW FG | NEW BG |
|---|---|---|---|---|---|---|
| X | 1 | 1 | 0 | 0 | 0 | -- |
| X | 0 | 8 | 1 | 1 | -- | 0 |
| X | 0 | 0 | 2 | -- | 0 | -- |
| X | 1 | 9 | 3 | -- | -- | 0 |
| 1 | 1 | [1,8] | 4 | -- | -- | 0 |
| 1 | 0 | [1,8] | 5 | -- | 0 | -- |
| 0 | 1 | [1,4] | 6 | **1 | **1 | **1 |
| 0 | 1 | [5,8] | 7 | **1 | **1 | **1 |
| 0 | 0 | [7,8] | 8 | 1 | -- | 0 |
| 0 | 0 | [1,6] AND IF ANY THREE IN ROW OR COLUMN IN 3X3 NEIGHBORHOOD ARE ALL 1s | 9 | **2 | **2 | **2 |
| 0 | 0 | IF ABOVE NOT TRUE | 10 | -- | 0 | -- |

TABLE 1

FIG. 7

NOTE: QUALITY OF FIGURE IS LOW (ACTUAL IMAGE)

NOTE: QUALITY OF FIGURE IS LOW (ACTUAL IMAGE)

NOTE: QUALITY OF FIGURE
IS LOW (ACTUAL IMAGE)

| IMAGE | FILE SIZE OF DIGITAL IMAGE DATA OUTPUT BY PRIOR ART 3-LAYER ALGORITHMS (KB) BG SCALE FACTOR = 4 | FILE SIZE OF DIGITAL IMAGE DATA OUTPUT IN ACCORDANCE WITH AN EMBODIMENT OF WITH PRESENT DISCLOSURE [AND OPTIONAL ADDED EDGE TECHNIQUES] (KB) | | |
|---|---|---|---|---|
| | | BG SCALE FACTOR = 4 | BG SCALE FACTOR = 3 | BG SCALE FACTOR = 2 |
| IMAGE 1 (E.G., SEATTLE IMAGES) | 330 (E.G., SEE FIG. 15) | 219 (E.G., SEE FIGS. 16 AND 19) | 226 (E.G., SEE FIG. 18) | 243 (E.G., SEE FIG. 17) |
| IMAGE 2 (E.G., EXCEL IMAGES) | 151 (E.G., SEE FIGS. 8 AND 10) | 124 (E.G., SEE FIGS. 11 AND 14) | 131 (E.G., SEE FIGS. 9 AND 13) | 149 (E.G., SEE FIG. 12) |
| ALTERNATE IMAGE 3 | 118 | 109 | 114 | 123 |
| ALTERNATE IMAGE 4 | 207 | 163 | 173 | 197 |
| ALTERNATE IMAGE 5 | 141 | 121 | 130 | 147 |
| ALTERNATE IMAGE 6 | 73 | 61 | 64 | 71 |

FIG. 20

SYSTEM AND METHOD FOR CLEANUP OF MRC IMAGES FOR IMPROVED COMPRESSION AND IMAGE QUALITY

BACKGROUND

1. Field

The present disclosure is generally related to a method of and system for improving storage of image data in digital printing or scanning. More specifically, the present disclosure relates to a method of and system for storing image data manipulated by mixed-raster content (MRC) segmentation processes for improved image quality.

2. Description of Related Art

Before image data is stored (and later output) to a digital output device, the image data is preferably compressed, i.e., coded to minimize the space needed to store and output the image data. In particular, due to its large size, digital image data that is output to a device such as a multi-function printer (e.g., for copying and/or printing) typically requires compression. For color or grayscale image data that is to be compressed, conversion of such image data to binary image data is generally not sufficient.

One technique for manipulating digital image data includes segmentation (or auto-segmentation). Segmenting image data into two or more planes tends to improve compression of the image, and also allows different compression methods to be applied to the different planes. For example, it is generally known in the art that a format such as mixed raster content (MRC) (also referred to as multiple raster content) may be used by digital multifunction devices (MFDs) to manipulate and compress image data. Such MRC compression models are becoming increasingly popular for image storage or archiving, especially for text documents and forms because of their increased compressibility.

In current 3-layer MRC models, for example, the generation of foreground and background planes or layers go through cleanup in a mark up edges module where certain areas in the foreground and background planes are filled with zeros (or some other value(s)) to reduce the file size. Current algorithms, however, generally do not improve image quality at this stage and restrict the cleaning of background and foreground planes to only four cases. Also, high compression ratios for noisy and halftone images may not provide a good enough image quality. For example, current algorithms may misdetect edges in such images (i.e., detect false edges).

Therefore, a method for improving output image quality as well as further reducing file sizes using MRC segmentation techniques is desirable.

SUMMARY

One aspect of this disclosure includes a processor-implemented method for processing an image data signal. The method includes the following acts implemented by a processor: segmenting the image data signal by:
determining a control signal for a pixel of interest in the image signal;
determining an edge signal based on the image data signal representing locations of edges in the image data signal;
determining a selector signal for identifying one or more foreground attributes of the image data signal based on the control signal and the edge signal;
determining an initial background layer signal representing background attributes of the image data signal and an initial foreground layer signal representing the foreground attributes of the image data signal based on the selector signal;
establishing a window comprising a pixel of interest and neighboring pixels in the selector signal;
determining a selector count based on a number of on and off pixels in the window;
determining an edge strength signal based on the selector layer signal;
producing a decision signal, the decision signal comprising a value that is chosen based on the following:
if the pixel of interest is off and all neighboring pixels are on, switch the pixel of interest off and assign a first value to the decision signal;
else, if the pixel of interest is on and all neighboring pixels are off, switch the pixel of interest off and assign a second value to the decision signal;
else, if the pixel of interest is off and some but not all neighboring pixels are on, apply a transformation to select a first alternate value from a range based on the selector signal, edge strength signal, and the selector count, and assign the first alternate value to the decision signal;
else, if the pixel of interest is on and some but not all neighboring pixels are off, apply a transformation to select a second alternate value from the range based on the selector signal, edge strength signal, and the selector count, and assign the second alternate value to the decision signal;
determining undefined pixels in the initial foreground and background layers based on at least the image data signal and the decision signal; and
outputting a final foreground signal and a final background signal, wherein a representation of the pixel of interest of the image data signal is included in at least one of the final foreground signal and the final background signal in accordance with the decision signal.

Another aspect of the disclosure includes a system for processing an image data signal, the system including: an input device for receiving the image data signal; a processor configured to process the image data signal, the processor having a segmentation module including code executable by the processor for performing a method including:
segmenting the image data signal by:
determining a control signal for a pixel of interest in the image signal;
determining an edge signal based on the image data signal representing locations of edges in the image data signal;
determining a selector signal for identifying one or more foreground attributes of the image data signal based on the control signal and the edge signal;
determining an initial background layer signal representing background attributes of the image data signal and an initial foreground layer signal representing the foreground attributes of the image data signal based on the selector signal;
establishing a window comprising a pixel of interest and neighboring pixels in the selector signal;
determining a selector count based on a number of on and off pixels in the window;
determining an edge strength signal based on the selector layer signal;
producing a decision signal, the decision signal comprising a value that is chosen based on the following:
if the pixel of interest is off and all neighboring pixels are on, switch the pixel of interest off and assign a first value to the decision signal;

else, if the pixel of interest is on and all neighboring pixels are off, switch the pixel of interest off and assign a second value to the decision signal;

else, if the pixel of interest is off and some but not all neighboring pixels are on, apply a transformation to select a first alternate value from a range based on the selector signal, edge strength signal, and the selector count, and assign the first alternate value to the decision signal;

else, if the pixel of interest is on and some but not all neighboring pixels are off, apply a transformation to select a second alternate value from the range based on the selector signal, edge strength signal, and the selector count, and assign the second alternate value to the decision signal;

determining undefined pixels in the initial foreground and background layers based on at least the image data signal and the decision signal; and outputting a final foreground signal and a final background signal, wherein a representation of the pixel of interest of the image data signal is included in at least one of the final foreground signal and the final background signal in accordance with the decision signal.

Yet another aspect of this disclosure includes a computer program product including: a computer-usable data carrier storing instructions that, when executed by a computer, cause the computer to perform a method including:

segmenting the image data signal by:

determining a control signal for a pixel of interest in the image signal;

determining an edge signal based on the image data signal representing locations of edges in the image data signal;

determining a selector signal for identifying one or more foreground attributes of the image data signal based on the control signal and the edge signal;

determining an initial background layer signal representing background attributes of the image data signal and an initial foreground layer signal representing the foreground attributes of the image data signal based on the selector signal;

establishing a window comprising a pixel of interest and neighboring pixels in the selector signal;

determining a selector count based on a number of on and off pixels in the window;

determining an edge strength signal based on the selector layer signal;

producing a decision signal, the decision signal comprising a value that is chosen based on the following:

if the pixel of interest is off and all neighboring pixels are on, switch the pixel of interest off and assign a first value to the decision signal;

else, if the pixel of interest is on and all neighboring pixels are off, switch the pixel of interest off and assign a second value to the decision signal;

else, if the pixel of interest is off and some but not all neighboring pixels are on, apply a transformation to select a first alternate value from a range based on the selector signal, edge strength signal, and the selector count, and assign the first alternate value to the decision signal;

else, if the pixel of interest is on and some but not all neighboring pixels are off, apply a transformation to select a second alternate value from the range based on the selector signal, edge strength signal, and the selector count, and assign the second alternate value to the decision signal;

determining undefined pixels in the initial foreground and background layers based on at least the image data signal and the decision signal; and outputting a final foreground signal and a final background signal, wherein a representation of the pixel of interest of the image data signal is included in at least one of the final foreground signal and the final background signal in accordance with the decision signal.

Other features and advantages of this disclosure will become apparent from the following detailed description, the accompanying drawings, and the appended claims.

BRIEF DESCRIPTION OF THE DRAWINGS

This disclosure contains at least one drawing executed in color. Copies of this patent or patent application with color drawing(s) will be provided by the Office upon request and payment of the necessary fee.

FIG. 7 shows a table which may be used to assign signal values in accordance with an embodiment of the present disclosure;

FIG. 20 provides a table which shows a comparison between file sizes of digital images output by a prior art three layer MRC segmentation system and the file sizes of digital images output in accordance with an embodiment of the present disclosure.

DETAILED DESCRIPTION

Figure 1:
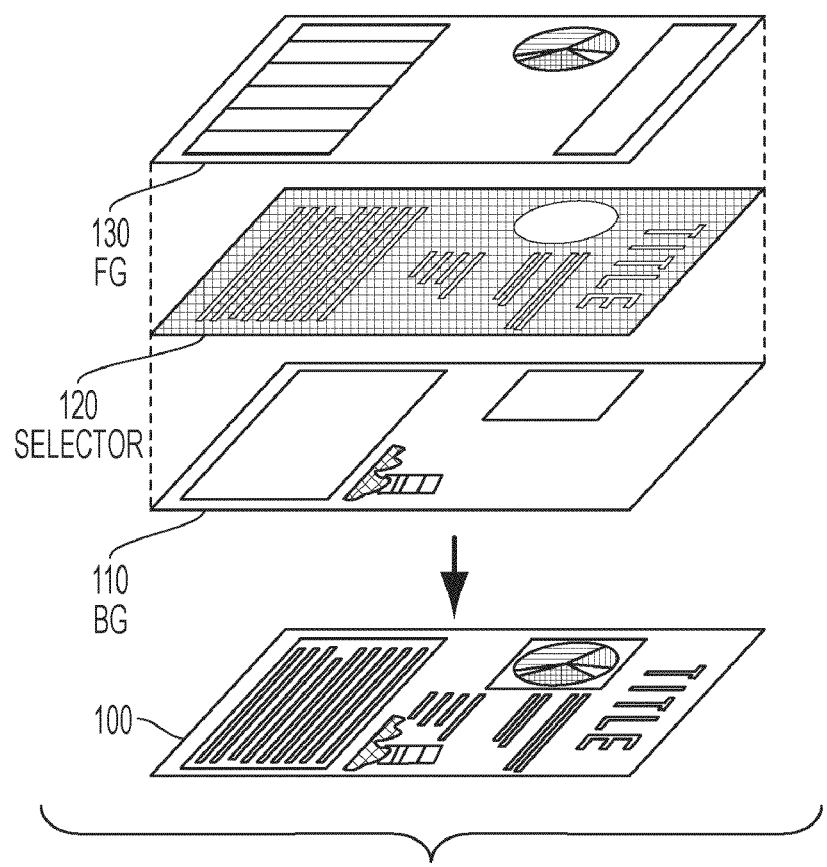
FIG. 1 illustrates an exemplary embodiment of an MRC segmentation structure for compressing image data of documents.

Various exemplary embodiments of systems and methods according to this disclosure process scanned and/or printed color documents to produce small, highly-compressed image data files that accurately capture the original document content. Scanning color images to network has started to become one of the standard features offered by digital multifunction devices today. File size is a key factor that one has to deal with while exporting color images. Apart from offering different resolutions, different compression schemes are being offered as well. One of the popular compression/file formats that are currently being offered is mixed raster content (MRC). According to various exemplary embodiments of systems and methods according to this disclosure, output files are generated in accordance with the mixed raster content (MRC) representation, which is now included in both TIFF and PDF standards, as well as the PostScript standard.

This disclosure proposes a way to modify an existing mark up edge module in 3-layer MRC models/systems to not only improve text quality in low and high contrast areas of image data, but also to improve file sizes in all images. It improves the quality and/or size of noisy and halftone images, for example. As will become further evident, such improvements may be made by some form of look-up table/template matching or forcing pixels of the background and foreground planes to zero, depending on the weak/strong edge information in the neighborhood pixels of a current pixel, as well as the current pixel values. It also improves the background image quality and reduces some of the ringing effects caused by original processing methods.

Throughout this disclosure, the terms "ON" and "OFF" are used with reference to describing pixels of image data in the binary domain. When referring to image data, the values associated with ON and OFF may be determined by the state of processing the image data. For example, when image data is being manipulated or segmented, an ON pixel may be defined as a pixel with a value of "0" (zero, e.g., white). Alternatively, in other embodiments, such as when image data is converted for output on a printer or machine, ON pixels are recognized by a value of "1" (e.g., indicating presence of black, color or gray levels for a printer to distribute link). For purposes of the embodiments described herein, OFF pixels will be identified as pixels with a value of "0" (zero), and ON pixels will be identified as pixels with a value of "1" (one) during processing. However, the terms "ON" and "OFF" and their associated values should not be limited.

As is generally known in the art, MRC format includes image data in more than one image plane—an approach to satisfying the compression needs of differing types of data—which separates image data into a plurality of planes and separately applies an appropriate compression technique to each image plane. Each of the planes 10-16 shown for the image data of page 100 may also be considered layers, and, therefore, the terms "plane" and "layer" are used interchangeably herein, and should not be limiting.

FIG. 1 illustrates an exemplary embodiment of a 3-layer MRC format or segmentation structure for compressing image data representing a page 100 or document. The image data of the page 100 may be segmented into a plurality of planes including a background plane 110 and at least one foreground plane 130, which are both multi-level, and an associated selector or mask plane 120, which is bi-level.

Typically, each plane is used for holding or storing information/image data related to the page 100 or document. For example, the selector or mask plane 120 may be used to store an image of the text and line art information. In some instances, the mask assists in preventing identified pixels of the image data from being visible when the image data is output, thereby reducing the noise in the output image. That is, the selector plane 120 may be used to mask undifferentiated regions of image data stored on the foreground plane 130 onto the background plane 110 to form the rendered image of the page 100. For example, the selector plane 120 may comprise high spatial frequency information for regions otherwise having slowly changing color information. Text may be provided and stored in a binary format.

The background plane 110 may typically be used to store continuous tone (contone) information such as pictures or photos or varying background colors that are found on the page 100 of image data. The background plane 110 may also or alternatively include information that is related to the background color of the page. Regions having high color frequency may be stored as continuous tone (contone) image data on the background plane 110.

The foreground plane 130 may store the color of the text and/or line art (e.g., such as the colors of the ink or toner to be used). It is also generally known that the foreground plane 130 may comprise a single color. When the image 100 is to be generated, the color information stored in the foreground plane 130 has the attributes of the selector plane 120 applied to it and the resulting color information is combined with the background plane 110 to form the reconstructed image 100.

The MRC structure also allows for a fourth plane, the Rendering Hints plane (not shown), which is used for communicating additional information about the content of the document. For example, the Rendering Hints plane may carry the ICC (International Color Consortium) color hints that identify the best color matching strategy for the various objects on the page. Segmenting the image data of the page 100 into different planes such as those noted above in the MRC structure of FIG. 1 allows for different compression methods to apply to each of the different planes, thereby allowing for reduced file sizes for storage, for example.

Figure 2:
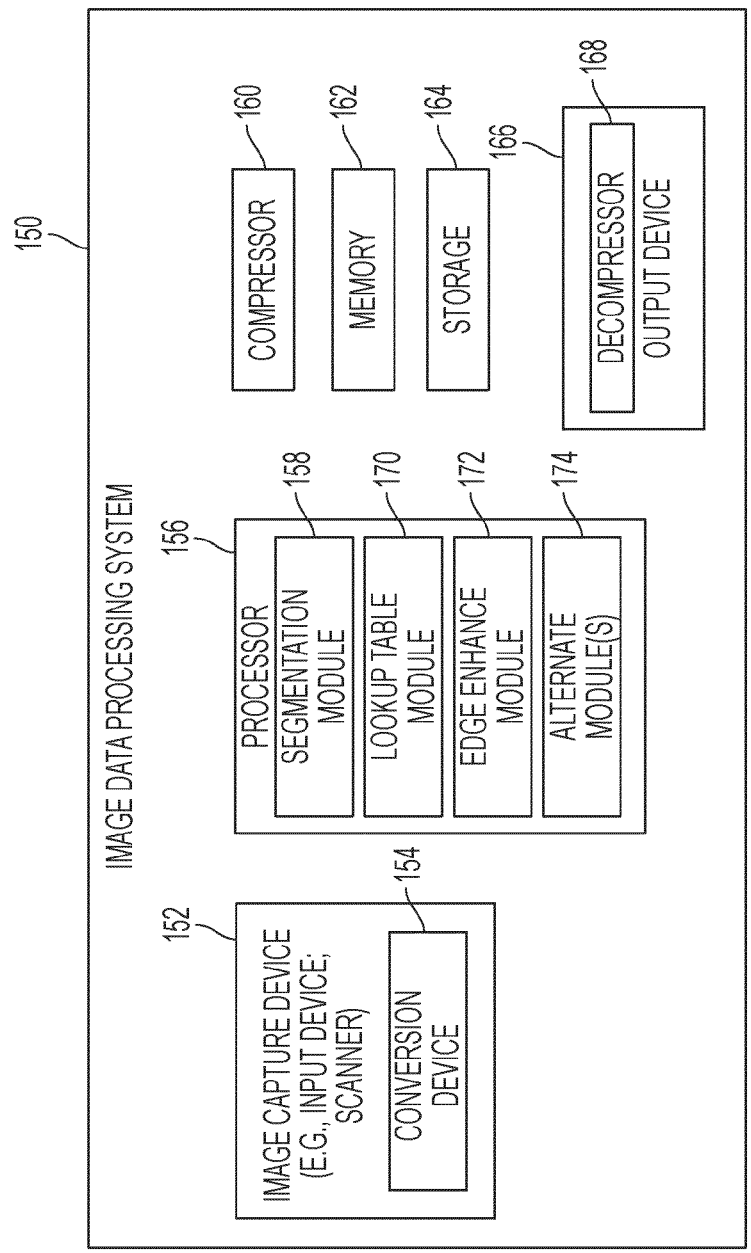
FIG. 2 is a block diagram illustrating an exemplary image data generating and processing system in accordance with an embodiment of the present disclosure.

FIG. 2 is a block diagram illustrating an exemplary image data generating and processing system 150 that may be used to segment, store, and/or output image data in accordance with an embodiment of the present disclosure. For example, the system 150 may comprise an image capture device 152, a processor 156, a compressor 160, memory 162 and/or storage 164, and an output device 166. Each of the devices shown in system 150 may also be considered modules, and, therefore, the terms "device" and "module" are used interchangeably herein. Furthermore, the devices or modules illustrated in FIG. 2 are not meant to be limiting. An example of segmentation algorithms and/or modules used to generate MRC images that may be utilized in this present disclosure include U.S. Pat. No. 7,242,802, entitled "Segmentation Method and System for Multiple Raster Content (MRC) Representation of Documents," issued Jul. 10, 2007, which is assigned to the same assignee (Xerox) of the present disclosure, and which is incorporated herein by reference in its entirety. In another exemplary embodiment, the system 150 may comprise one or more modules as illustrated in U.S. Pat. No. 7,324,120 B2, entitled "Segmentation Method and System for Scanned Documents," issued Jan. 29, 2008 to the same assignee for the present disclosure, which is also herein incorporated by reference in its entirety. It is to be understood that any number of elements or modules may be used and that additional operations or processes besides those described below may be provided.

Referring back to the exemplary system 150 of FIG. 2, the image capture device 152 is configured to provide and/or receive image data, such as an input device. The image capture device 152 may comprise any type of device for providing, receiving and/or inputting image data, such as an input image terminal, scanning device, facsimile device, computing device, copying device, MFD, storage device, etc. In an embodiment, the image capture device 152 may comprise a conversion device 154 for converting the image data, such as converting grayscale image data from an input device color space, such as RGB (red, green, blue), to a device independent processing color space, such as YCC or LAB color space, where intensity and color information (i.e., luminance and chrominance) are separated. Generally, the types of color spaces for image data and the conversion of such color spaces are known in the art. The conversion device 154 may be a part of the image capture device 152 or a separate device or module. At least one compressor 160 is provided in system 150, and is configured to compress the image data received by the image capture device 152 and processed by the processor 156. For example, the compressor 160 compresses each of the background plane, selector plane, and foreground planes of an image, such as image 100. Separate compression techniques that are adapted to the types of data stored may be used for each plane.

A processor 156 is configured to process pixels of the image data in order to separate or segment the image data signal (or input data) into layers, using a segmentation module 158, via an MRC model, for example. Segmentation module 158 segments the image data to generate background image data, selector plane image data, and foreground image data, for example. In an embodiment, segmenting image data comprises: searching for a minimum and maximum within at least one window centered on the pixel of interest in the image data; computing for at least one window, based on the minimum and the maximum, a respective indicator representing the distance and direction of the pixel of interest relative to a threshold plane and determining a control signal based on the indicator; sub-sampling the image data into the background layer, the foreground layer, and the selector layer, and separating the image data into the background layer, the foreground layer, and the selector layer in accordance with the control signal by including a representation of the pixel of interest in at least one of the layers. Further description regarding segmentation may be found in the incorporated '802 patent. For example, the image data signal may comprise a luminance signal, a first chrominance signal and a second chrominance signal, as generally known in the art. When searching for the minimum and maximum, the processor may perform the following operations: searching for a luminance minimum and a luminance maximum in the luminance signal within the window; indexing locations of the luminance maximum and luminance minimum within the window; and outputting the luminance minimum, the luminance maximum, and values in the first and the second chrominance signals that correspond to the locations of the luminance minimum and luminance maximum. The processor may perform the operations of searching, indexing and outputting for each window in a set of windows for the image data.

Figure 3:
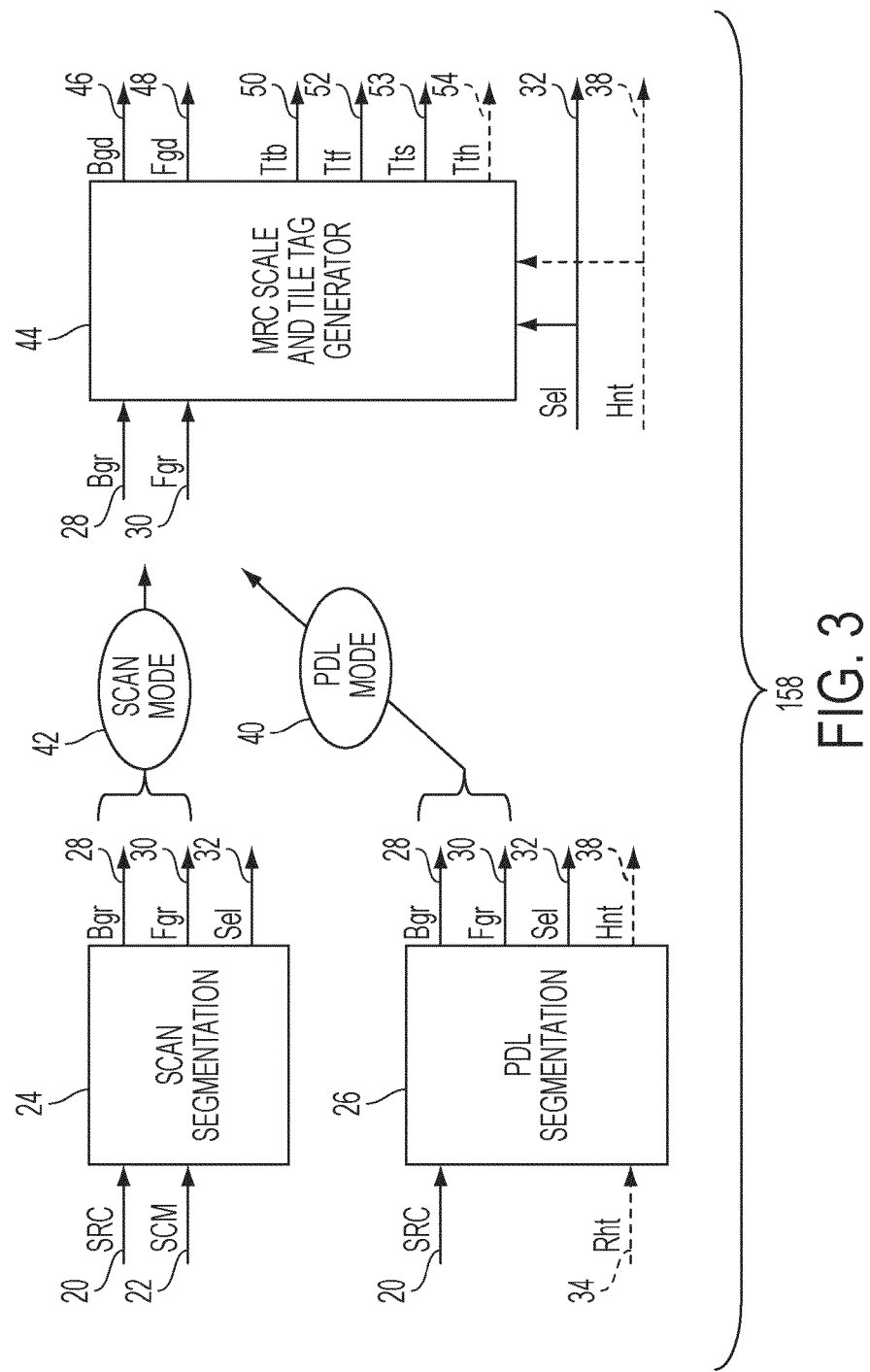
FIG. 3 illustrates an exemplary block diagram of a segmentation module of the image data generating and processing system of FIG. 2 in accordance with an embodiment of the present disclosure.

Further details regarding the segmentation module 158 are further described with regard to FIG. 3. Processor 156 may also include a look-up table module 170, edge enhance module 172, and one or more other or alternate module(s) 174. Look-up table module 170 may include look-up tables which are used to convert color foreground and background data from device dependent to device independent color space (e.g., YCC to L*a*b) before compression, for example. Edge enhance module 172 may be used to further enhance edges of an image, including texts, objects, and lines, for example. Alternate modules 174 may correspond to other modules for processing and/or manipulating data such that the output image may be further improved. The addition of such modules should not be limiting.

As will become evident, the processor 156 (and/or its associated modules, e.g., modules 158, 170, 172, and 174) may be used to perform or implement at least the steps 610-614 and steps 624-636 as described below in method 600 of FIGS. 6A-6B. The processor or processing elements may be a combination of image processing elements or modules which comprise software and hardware elements that may perform a number of operations on the image data received from the image capture device 152 using a set of parameters. The parameters may be used to convert the images to the format desired as output (e.g., high quality) along an image path. The elements may be a part of a computer system, device, or apparatus such as a xerographic system, a photocopier, a printing device, or a multi-function device (MFD).

Memory 162 and/or storage 164 are storage devices for storing the MRC image data, such as noted at 618 in method 600. An output device 166 may be provided to output the image data as noted at 622. Output device 166 may be any type of device that is designed to output the image data. For example, the output device may display, copy, print, or send the image data. Such an output device may be an MFD, printer, copier, scanner, facsimile device, display, a terminal, an image storage system, or CPU, for example. In an embodiment, the output device 166 may decompress the image data and its information in the background metadata before output. In an embodiment, a decompressor 168 is provided in system 150 to decompress layers of MRC image data before sending the image data to output device 168, if needed. The decompressor 168 and output device 166 may be the same module, or separate modules.

Additionally, in some embodiments, additional modules may be provided in system 150. For example, threshold, comparator and/or metadata generating devices or modules may be provided in system 150.

The processor 156 and/or its elements may execute machine readable executable instructions stored in memory 162 or storage 164. For example, the method described herein may be stored the form of computer executable instructions so as to provide a computer readable media or data structure that may be executed by a computer to direct a computer to perform the method to reduce the file size of the MRC image data.

Specifically, the segmentation module 158 is capable of receiving a full color input image to be segmented, and producing three separate outputs for at least the three MRC planes: the Foreground (FG) plane 130, Background (BG) plane 110, and Selector plane 120, as well as several additional outputs. Such outputs are described and shown as signals input to and output from segmentation module 158 via signal lines in an exemplary block diagram in FIG. 3, which is similar to the segment module provided in the incorporated '802 patent. Segmentation module 158 is composed of two stages: a Segmentation stage followed by an MRC Scale and Tile Tag Generation stage 44. The Segmentation stage can operate in one of two mutually exclusive modes: Scan Segmentation 24 or page description language (PDL) Segmentation 26.

In scan mode 42 (e.g., images in non-PDL mode), Scan Segmentation module 24 is responsible for performing the MRC segmentation into at least three planes (signals) in the case of scanned (or input) documents. One input signal provided to Scan Segmentation module 24 includes input color signal SRC 20. An 8-bit screen magnitude estimate signal SCM 22, which is further detailed in U.S. Pat. No. 7,375,856 and which is incorporated by reference herein in its entirety, may also be input into Scan Segmentation module 24. Scan Segmentation module 24 outputs the full-color (raw) Foreground and Background planes Fgr 30 and Bgr 28, and (possibly super sampled) Selector plane Sel 32, which is exported by Scan Segmentation module 24, based on at least the input signal SRC 20.

In PDL mode 40, input color signal SRC 20 is received or input to PDL Segmentation module 26. PDL Segmentation module 26 does not use 8-bit screen magnitude estimate signal SCM 22, but instead may use a rendering hint signal Rht 34, which captures hint information from a PDL interpreter, and will be encoded by PDL Segmentation module 26 into a CEF Hint plane Hnt 38. Output from the PDL Segmentation module 26 includes the full-color initial (raw) Foreground and Background planes Fgr 30 and Bgr 28, the binary Selector plane Sel 32, and possibly the Hint plane Hnt 38 when hints are present. The Hint plane can be 1-bit or 8-bit deep, for example. The Selector plane 32 output is binary (1 bit deep), and the packed Selector plane SPK (shown in FIG. 4) packs together 2×2 binary neighboring Selector pixels.

In general, the exported Foreground, Background, and Selector planes could all be at different resolutions relative to the input image. For example, the Foreground and Background planes are typically down-sampled while the Selector plane may be up-sampled from the original input resolution. The amount of up or down sampling is programmable under software control.

The MRC Scale and Tile Tag Generation module 44 reads in the initial (raw) Background Bgr 28, Foreground Fgr 30, Selector Sel 32, and the optional Hints Hnt 38 if any exist (in PDL mode). It produces the (final) color MRC layer signals: Background Bgd 46 and Foreground Fgd 48 (e.g., by subsampling and filling in the 'holes' or previously unassigned pixels in the raw images). In addition, the MRC Scale and Tile Tag Generation module 44 generates four associated Tile Tag signals for the Background Ttb 50, Foreground Ttf 52, Selector Tts 53, and optional Rendering Hints Tth 54 if any exist (in PDL mode). The Tile Tag is one binary bit per tile (or strip) indicating whether the current tile may be altogether omitted. This also contributes to further reducing an overall file size. In some embodiments, missing tiles are automatically filled to pre-defined default color for each plane.

Figure 4:
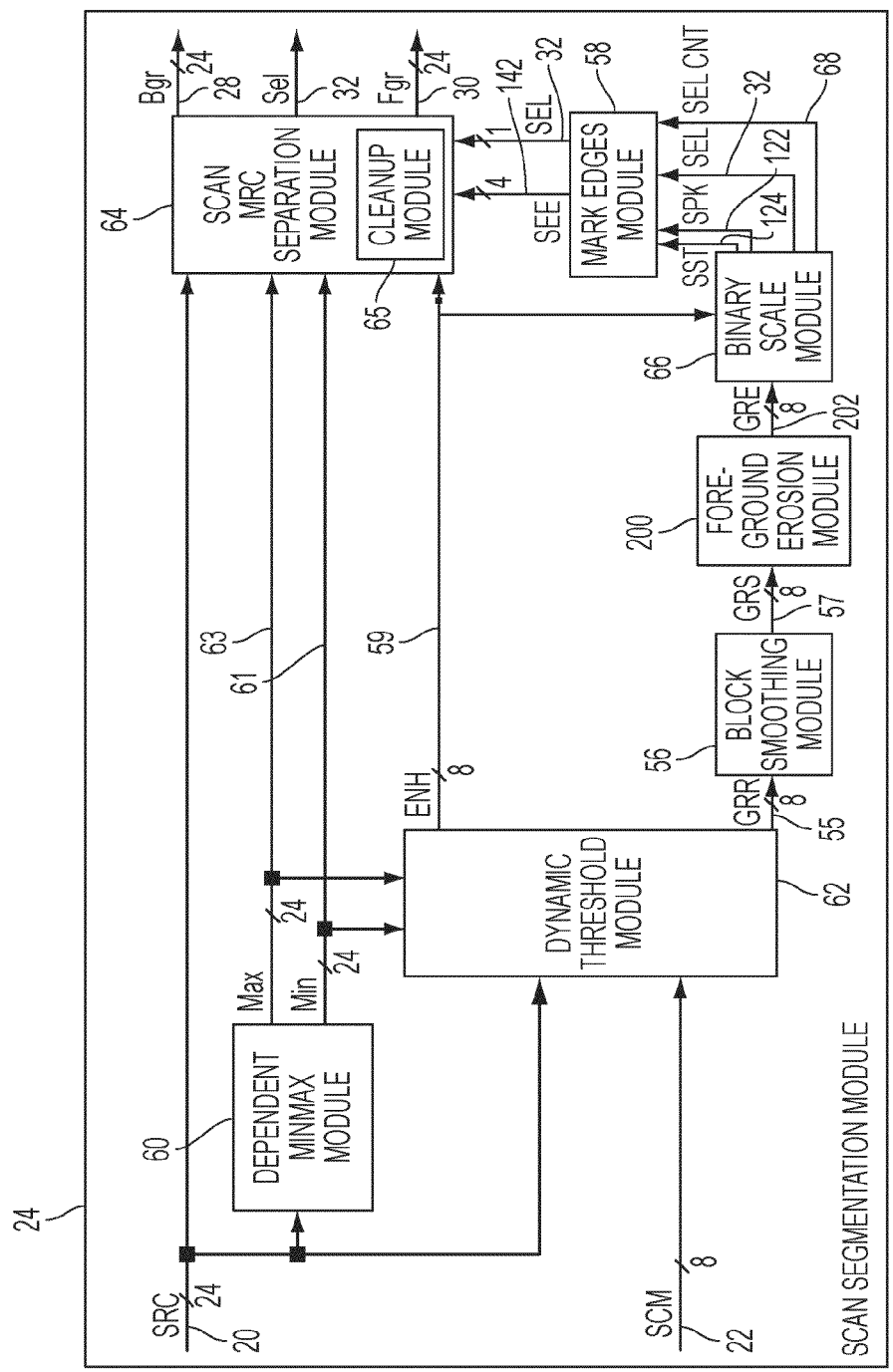
FIG. 4 illustrates an exemplary block diagram of a scan segmentation module in accordance with an embodiment of the present disclosure.

FIG. 4 illustrates in greater detail an exemplary embodiment of a block diagram of Scan Segmentation module 24 shown in FIG. 3. The following is a brief description of the various modules comprising the Scan Segmentation module 24. Additional description and details regarding the other noted modules may be found in the incorporated '802 and '120 patents, for example.

The color input signal SRC 20 is provided over signal lines to a Dependent Min-Max module 60, a Dynamic Threshold module 62 and a Scan MRC Separation module 64. The Scan Segmentation module 24 may also input the 8-bit screen magnitude estimate signal SCM 22, if available, over a signal line to the Dynamic Threshold module 62.

Figure 5:
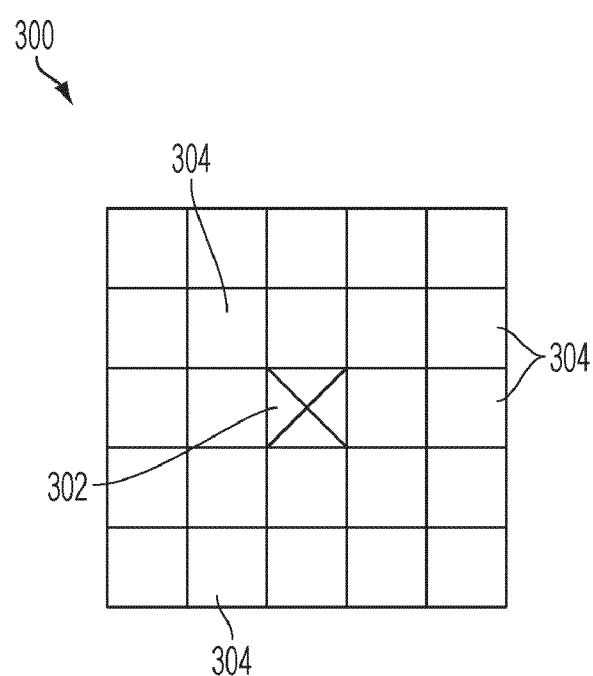
FIG. 5 is an example of a window of image data with a pixel of interest and neighboring pixels.

Dependent Min-Max module 60 outputs for each pixel in the image data signal/input image data (received via input signal SRC 20) a local maximum image value signal Max 63 over a signal line and a local minimum image value signal Min 61 over a signal line to the Dynamic Threshold module 62 and to the Scan MRC Separation module 64. That is, for each pixel in the image being converted, a window defining a neighborhood around that pixel is applied to that pixel and maximum and minimum image values of pixels within that window are determined and identified as the dependent maximum and dependent minimum image values for that pixel of interest. FIG. 5 illustrates an example of a window 300 of image data for determining the maximum Max and minimum Min of a pixel of interest (e.g., a center pixel) in the image data. Specifically, window 300 is formed around a pixel of interest 302 (in the image data signal) and its neighboring pixels 304 are evaluated to determine minimum and maximum values of the image data. In FIG. 5, a 5×5 window is shown. However, window 300 may comprise other known dimensions (e.g., 7×7, 3×3, N×M) for dynamic thresholding. Generally, such a method is known and therefore not described in further detail. Also, window 300 may represent a window comprising a pixel of interest and neighboring pixels in the selector signal, so that a selector count and decision signal may be determined for outputting final background and final foreground signals. Exemplary embodiments of these steps are further described below.

Referring back to FIG. 4, the minimum Min 61 and maximum Max 63 values are forwarded to a Dynamic Threshold module 62 and a Scan MRC Separation module 64. Dynamic Threshold module 62 processes the input color image SRC 20, the 8-bit Screen Magnitude estimate signal SCM 22, the minimum signal Min 61, and the maximum signal Max 63. Dynamic Threshold module 62 generates an 8-bit segmentation enhancement control signal ENH 59, which is used to communicate to Scan MRC Separation module 64 and to a Binary Scale module 66. ENH control signal 59 of Dynamic Threshold module 62 communicates, on a pixel-by-pixel basis, if segmentation is to be applied to the image data signal, and if so, how much additional enhancement to apply as pixels are placed in background and/or foreground planes. For example, ENH control signal 59 may include information relating to strong edges in the initial background and initial foreground planes of the image. The control signal is determined for a pixel of interest in the image signal.

Dynamic Threshold module 62 also outputs an edge signal representing the locations of edges in the selector layer based on the image data signal, the biased zero crossings of which represent the locations of edges in the selector plane. As shown, the edge signal is output in the form of a (raw) monochrome (gray level) 8-bit signal GRR 55 to a Block Smoothing module 56. Weak and strong edge signals are further modified here. The incorporated '802 application, for example, provides further description regarding such processes. Block Smoothing module 56 filters the raw gray edge signal GRR 55 and outputs a smooth gray selector edge signal GRS 57 over a signal line to Binary Scale module 66 via Foreground Erosion module 200. The purpose of Block Smoothing module 56 is to move weak (a.k.a. false) edges away from strong edges to prevent high contrast transitions, thereby increasing overall compression and quality. The output from the Block Smoothing module 56 is an 8-bit smoothed signal GRS 57, which represents a smoothed (filtered) version of the incoming edge signal GRR 55.

In some embodiments, a Foreground Erosion module 200 may receive edge signal GRS 57 and may be used to convert pixels from initial foreground to background and/or match templates in some cases before sending to Binary Scale module 66. Foreground Erosion Module 200 then outputs an edge signal GRE 202 to Binary Scale module 66. The edge signal GRE 202 is an 8-bit signal which represents a processing version of the incoming signal GRS 57.

Binary Scale module 66 generates the binary selector signal represented as selector SEL 32, by thresholding the edge signal GRE 202 (or signal GRS 57), which, after further modifications in the Scan MRC Separation module 64 and Mark Edges module 58, forms the selector plane SEL 120. The binary selector signal SEL controls the MRC separation into foreground FGD and background BGD planes. It includes information for weak and strong foreground edges, for example. In order to provide high quality separation for high-quality text and line-art reproduction, the binary selector signal SEL 32 can be generated at higher multiples of the input scanner resolution. Binary Scale module 66 provides the capability to super-sample the resulting smoothed gray selector signal GRS 57 from the Block Smoothing module 56 output, or the signal GRE 202 from Foreground Erosion module 200. For example, image data is typically scanned at a fixed resolution, such as 300 or 600 dots per inch. In order to improve text and line-art quality, the binary selector signal SEL 32 can be generated and outputted at higher resolution by super-sampling the Selector plane at twice the input resolution (for example, 1200 dots per inch). The super-sampling of the Selector signal is done by doubling the sampling frequency prior to thresholding, for example. When higher resolution is used (i.e., scale up by 2 or more), multiple binary SEL bits are generated for each input pixel. These bits are packed together as the packed selector signal SPK 122, and sent sequentially to the output. For instance, when the selector is up-sampled by 2 times, the packed selector SPK output will contain four bits for each input pixel, and thus SPK is now effectively at twice the input resolution.

Binary Scale module 66 also receives as input the enhanced image data control signal ENH over a signal line to output a smoothed grayscale signal, such as the selector signals noted above. Typically, the Binary Scale module 66 outputs the packed selector signal SPK 122 or selector signal SEL 32 over the signal line to the mark edges module 58. However, unlike the incorporated '802 patent, in this disclosure, Binary Scale module 66 further produces an edge strength signal SST 124 based on the selector layer, which relates to strong edge information of both foreground and background planes. The 8-bit signal GRE 202 is used and results in the divided signals SEL 32 (or SPK 122) and SST 124 which are sent over signal lines to Mark Edges module 58. Binary Scale module 66 also determines and sends information regarding selector pixel count, noted as SEL CNT 68, based on a number of on and off pixels in the window per the selector signal (e.g., selector pixels that are ON), which would be the same as foreground count.

Mark Edges module 58 analyzes bit pattern of the packed selector signal SPK 122, which can be at the same or higher multiple of the input resolution, or the selector signal SEL 32. Mark Edges module 58 extracts the information relevant to MRC separation from the packed selector signal SPK 122/selector signal SEL 32. It generates the selector extract signal SEE 142 using the information received from Binary Scale module 66. The information is then conveyed to Scan MRC Separation module 64 by means of the selector edge extract SEE signal 142.

Additionally, the input signals SST 124 and SPK 122 (or SEL 32) are used with the selector pixel count 68 to set a value of output signal SEE 142. SEE signal 142 acts as a decision signal for outputting a foreground signal and a background signal which represents pixel(s) of the image signal and modifying the selector signal accordingly. However, in this disclosure, the selector edge extract signal SEE 142 can have more values based on the input signals SST 124, SPK 122/SEL 32, and the selector plane count 68.

In the existing 3 layer MRC model of the '120 patent, for example, the Mark Edges module 58 cleans up foreground and background planes of image data based on the selector signal (e.g., SEL), strength of the edges and the selector info of the N×M neighborhood of the current pixel of interest. However, existing three layer MRC models such as shown in the incorporated references neither take into account current background and foreground pixel values, nor do they compare the difference between the two values. In these models, based on current and neighborhood pixel edge information in the selector plane, the signal SEE takes on 4 values (0, 1, 2, or 3) and the foreground and background planes are filled with zeroes (0) for some of these values depending on the edge strength.

For example, in the methods of the '802 and '120 patents, the Mark Edges Module 58 would take the Selector signal SPK 122 and count a number of "ON" and "OFF" pixels in a window N×M (such as window 300 of FIG. 5) centered on a current pixel of interest (such as pixel 302). In the art, output from the Mark Edges Module 58 would be a SEE signal comprising one of four values. For example, the SEE signal would be set to 0 if all of the input pixels inside the window are 0 (corresponding to a constant background area). Similarly, the SEE signal could be set to 3 if all of the input pixels inside the window are on (corresponding to a constant foreground area). In addition, the output SEE signal could be set to either 1 or 2 if the content of the window is mostly background or mostly foreground, respectively.

The following is an exemplary map to an output SEE signal from the Mark Edge Module 58 as known in the art (e.g., such as in the incorporated '802 and '120 patents):

SEE=0 if the count in the window was 0 (i.e., no foreground pixels found);

SEE=1 if the count was in the range [1 . . . 12] (i.e., mostly background pixels);

SEE=2 if the count was in the range [13 . . . 24] (i.e., mostly foreground pixels);

SEE=3 if the count was equal to the total number of pixels in the window (only foreground pixels found).

Although such processing and manipulation may clean up the foreground and background planes, previous algorithms (such as the ones provided by the incorporated '802 and '120 patents) fail to provide the desired image quality improvement at this stage (i.e., at the Mark Edges module 58, for cleaning up the foreground and background planes). The present disclosure, therefore, modifies the manipulation and processing of image data/signals in the Mark Edges module 58 in order to improve the image quality for output, as well as reduce file sizes (e.g., such as in noisy and halftone images). Specifically, the Mark Edges module 58 increases the parameters of at least the output SEE signal 142 and uses look-up tables and/or templates when processing the image data/signals. Adding some more parameters and allowing cleaning to take place through template matching, for example, provides better file sizes, as will become further evident by the description of the algorithm or method 600 below. It also improves the image quality by pushing false edges to the background, and extracting weak edges in low contrast text areas (which were not detected earlier) into the foreground plane.

As such, the proposed disclosure process the data according to the following processor-implemented logic, which may be embodied as machine-readable instructions stored in a memory executed by a processor:

Binary Scale module 66 divides the received edge information into two categories, such as noted in the prior methods. That is, strong edges of both the background and foreground planes may go into the output edge strength SST signal 124, and selector plane SEL signal 32 holds information on weak and strong edges of the foreground plane. This information is fed to Mark Edge Processing Module 58 which also takes in the packed high resolution Selector output SPK 122 and counts the number of "ON" and "OFF" pixels in a window 300 centered on a current pixel of interest 302, for example, to determine the selector count (e.g., from SEL CNT 68). The output from Mark Edges Module 58 includes the SEE signal 142, which can have increased multiple values beyond the 4 in the above-incorporated patents. The process of assigning the signal values is further described below with reference to FIGS. 6-7.

Mark Edges module 58 then outputs the SEE signal 142 and SEL signal 32 into a Scan MRC Separation Module 64. Scan MRC Separation module 64 produces two full-color outputs Bgr 28 and Fgr 30 as rough estimates of the Background and Foreground planes, respectively. Scan MRC Separation module 64 also modifies the selector signal SEL 32 and outputs such signal accordingly. Scan MRC Separation Module 64 takes in the full input color source signal SRC 20 to be segmented as well as the color minimum Min 61 and maximum Max 63 from the Dependent Min-Max Module 60. Using the SRC 20, Min 61, Max 63 and ENH 59 signals, it internally generates an initial foreground and an initial background signal/layer which may be further modified to produce Bgr 28 and Fgr 30. In addition, the Scan MRC Separation Module 64 uses the SEE signal 142 from the Mark Edge Processing module 58, and has the capability to enhance the lifting of edges via the segmentation and enhancement signal ENH 59 from the Dynamic Threshold module 62. The received SEE values 142 dictate how to change the signals or values associated with the selector, background, and foreground planes in the Scan MRC Separation module 64. For example, in an embodiment, foreground and background values may be changed by taking into account the foreground and background values input into the module 64. The Scan MRC Separation Module 64 may use the value of the Selector edge count signal SEE 142 from the Mark Edge Module to determine whether to copy enhanced SRC pixels into the Background, Foreground, or both.

In an embodiment, Scan MRC Separation module 64 may include (or be associated with) a Cleanup module 65. Cleanup module 65 may include one or more templates or look-up tables, for example. In an embodiment, such templates or tables may be used to further clean the foreground and background data, based on the internally generated initial foreground and initial background layers. In one embodiment, the initial background and initial foreground layers are input to the Scan MRC Separation Module.

Referring back to FIG. 3, after processing of the image data is performed by Scan Segmentation module 24 of segmentation module 158, a MRC Scale and Tile Tag Generator module 44 receives the Bgr 28 and Fgr 30 signals and then further processes the Bgr 28 and Fgr 30 to produce final Foreground and Background outputs Bgd 46 and Fgd 48, respectively. For example, Scan MRC Separation Module 64 of Scan Segmentation module 24 may reserve a special code of zero luminance and chroma (L=a=b=0) to indicate an empty (undetermined) pixel in either the Foreground Fgr 30 or the Background Bgr 28 outputs. As the process continues across the page of image data, some of the Foreground and Background pixels may remain undetermined. MRC Scale and Tile Tag Generator module 44 will then carefully fill in values for these undetermined pixels to keep the compression low and prevent additional output quality issues, such as (JPEG) ringing artifacts.

Figure 6A:
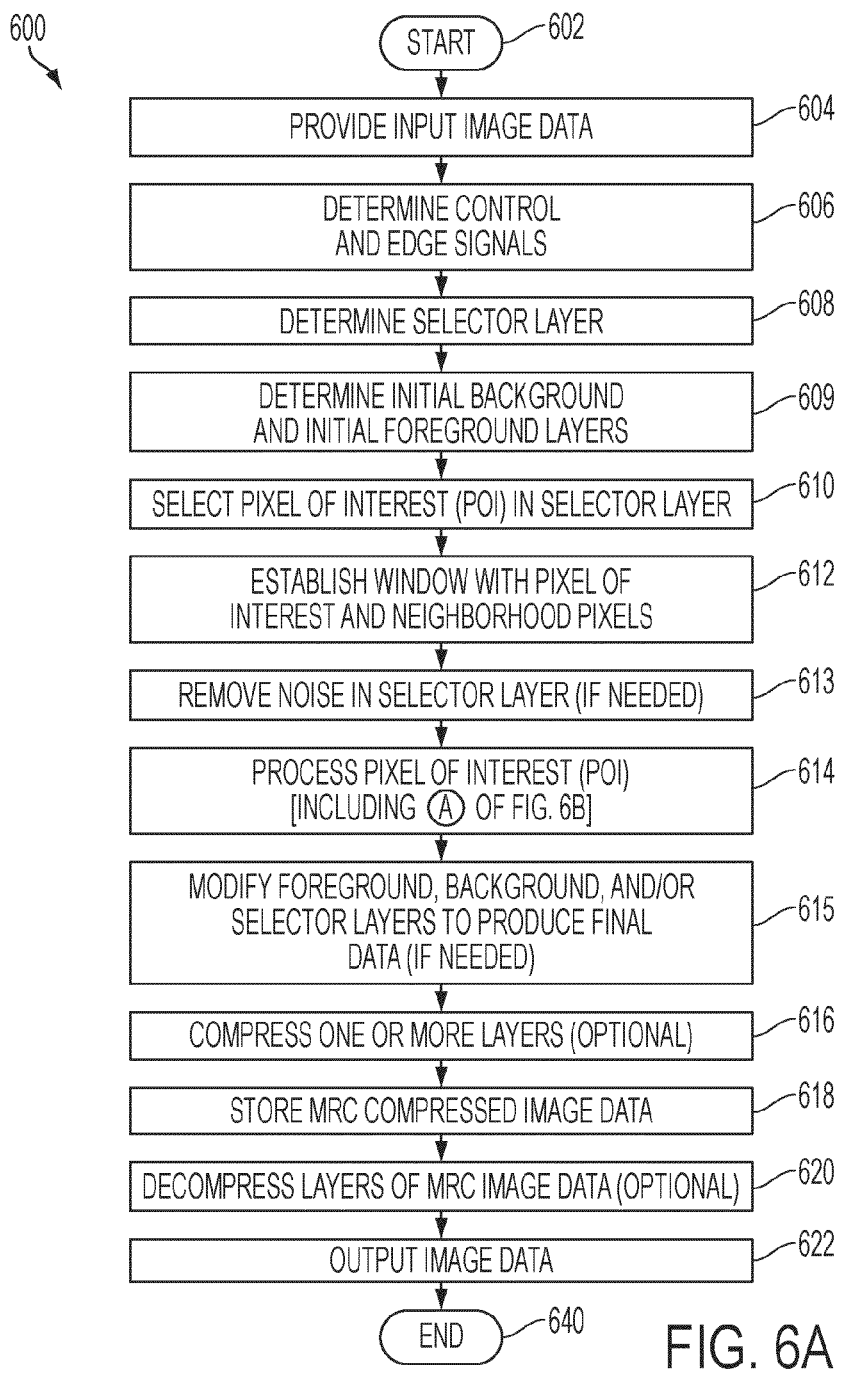
FIGS. 6A-6B are flow chart diagrams illustrating a method for processing and storing image data in accordance with an embodiment of the present disclosure.
Figure 6B:
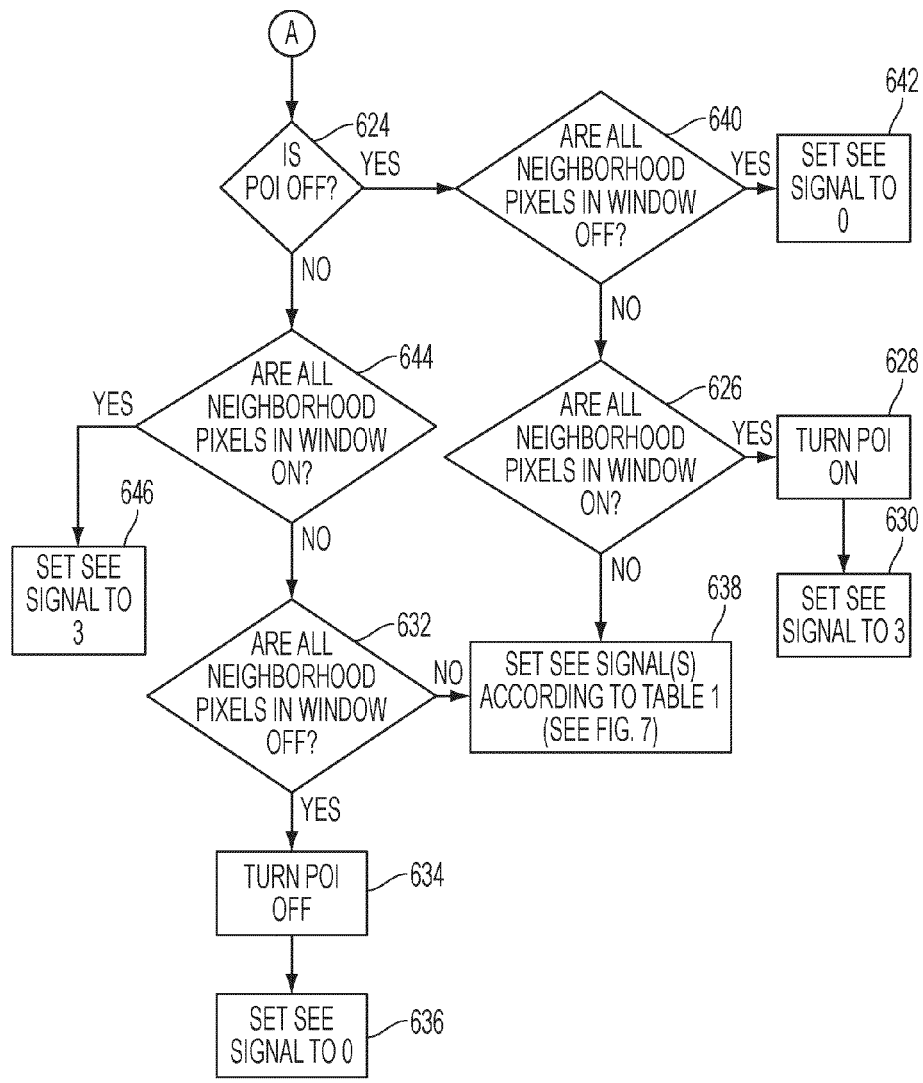

FIGS. 6A-6B are flow chart diagrams illustrating a method 600 of processing and storing image data in accordance with an embodiment. As shown in FIG. 6A, the method 600 is started at 602, and input image data comprising a plurality of pixels is provided at 604. The image data may be provided or received as input, for example, by an image capture device such as device 152 of system 150 in FIG. 2. In embodiments, the image capture device may be an input device. As described above, for example, an image capture device may be any type of device for providing an image data signal/input image data, such as a scanning device, facsimile device, computing device, storage device, etc. The image data is then processed as shown by 606-615 to segment the image data into planes and prepare the image data for storage or archiving. Segmentation module 158 and/or processor 156 of the system 150 may perform such processes shown by 606-6154 (and associated decisions 624-638 as described in FIG. 6B), for example.

Specifically, the image data is segmented by a number of steps (e.g., via segmentation module 158 and its components) to generate a background layer signal (e.g., layer 110 of FIG. 1) representing background attributes of the image data signal, a selector layer signal (e.g., layer 120 of FIG. 1) representing a selector layer for identifying one or more foreground attributes of the image data signal not included in the background layer, and one or more foreground layer signals (e.g., layer 130) representing the foreground attributes of the image data signal (and possibly any optional layers). At 606, the control signal and the edge signal of the input image data is determined. Thereafter, a selector signal is determined at 608. An initial background layer (signal) and an initial foreground layer (signal) are then determined at 609.

A pixel of interest (POI) is selected in the selector layer at 610 for processing. Particularly, a window N×M is established at 612 with the pixel of interest and neighborhood pixels in the selector layer. The window established at 612 may be a window 300 as shown in FIG. 5, for example, as generally described above and known in the art. Values for M and N could be 3 or 5, for example. Noise is removed in the selector layer at 613 (if needed). Thereafter, the POI is processed at 614, discussed in further detail below.

After processing, at 614, the initial foreground, initial background, and/or selector layers may be modified to produce a final foreground, final background, and selector signal (if modification is required, i.e., based on the processing at 614) at 615. Then one or more layers may be optionally compressed (e.g., by compressor 160) at 616, and the MRC compressed image data may be stored at 618 (e.g., in memory 162 or storage 164 of system 150). When ready for output, the layers of the MRC image data are optionally decompressed (e.g., via output device 166 or decompressor 168) at 620 and then the image data is output at 622 via an output device 166 to end at 640.

The POI (and current pixels of interest thereafter) of the selector layer SEL of the image data may undergo processing at 614 by modules or devices such as described above with respect to FIG. 4. More specifically, the signal values are processed by Mark Edges module 58 and Scan MRC Separation module 64 to output values for the image data that are of high quality and low file size. The processing at 614 includes determining the SEE signal 142, which may include a number of values. As further detailed below with respect to FIG. 6B, the processing of signals involves the following steps:

1. Noise removal is applied to remove any noisy foreground/background pixel in the selector plane SEL by looking at the neighborhood in the window N×M of the current pixel of interest POI. If all pixels in the neighborhood of the current selector pixel sel are ON, with current pixel OFF, it is turned ON. If all pixels in the neighborhoods of the current selector pixel sel are OFF, with current pixel ON, it is turned OFF.

2. All the ON pixels in the N×M neighborhood of the current pixel in the selector plane SEL are then added. If all of the neighborhood pixels are filled, i.e., the N×M window has all ON pixels, the SEE signal 142 value is set to 3. If all of the neighborhood pixels in the window are OFF, then the SEE signal 142 is set to 0 (zero).

3. If neither steps 1 nor 2 above are true, the SEE signal 142 values are set according a look-up table (or template). The SEE signal 142 values can range from 0 to n, for example.

FIG. 6B illustrates the above steps in further detail. Specifically, after POI and window processing at 610 and 612, it is determined at 624 if the POI is "OFF." If the current POI is OFF (i.e., YES), it is determined if all of the neighborhood pixels in the window are "OFF" at 640. If all of the neighborhood pixels in the window are OFF (i.e., YES), then the N×M window has all OFF pixels (no foreground pixels found) and the SEE signal 142 is set to a value of 0 (zero) at 642.

If it is determined at 640 that all of the neighborhood pixels are not OFF (i.e., NO (e.g., some may be "ON")), it is determined at 626 if all of the neighborhood pixels are "ON." If all of the neighborhood pixels are determined at 626 to be ON (i.e., YES), then the POI is also turned ON at 628. As such, the N×M window has all ON pixels. The SEE signal 142 is then set to a value of 3 at 630.

If, however, it is determined at 626 that not all of the neighborhood pixels are "ON," (i.e., NO) (e.g., any or some may be OFF), then the value for the SEE signal 142 is set according to a look-up table at 638.

Alternatively, if the POI is determined not to be "OFF" at 624 (i.e., "NO" (or the POI is "ON")), it is determined at 644 if all of the neighborhood pixels in the window are "ON." If all of the neighborhood pixels in the window are ON (i.e., YES), then the N×M window has all ON pixels (all foreground pixels found) and the SEE signal 142 is set to a value of 3 at 646.

If it is determined at 644 that all of the neighborhood pixels are not ON (i.e., NO (e.g., some may be "OFF")), it is then determined at 632 if all of the neighborhood pixels the window are "OFF." If all of the neighborhood pixels in the window are all OFF (i.e., YES), then the POI is also turned off at 634. The N×M window thus has all OFF pixels and the SEE signal 142 is then set to a value of 0 (zero) at 636.

If, however, it is determined at 632 that not all of the neighborhood pixels in the selector plane are "OFF" (i.e., NO at 632) (e.g., any or some may be ON), then the value for the SEE signal 142 is set according to a look-up table (or template) at 638.

Thus, if the POI is OFF, and some of the neighborhood pixels are ON, the value for the SEE signal 142 may be set according to a look-up table (or template). If the POI is ON, and some the neighborhood pixels are OFF, the value for the SEE signal 142 may be set according to a look-up table (or template). FIG. 7 shows an exemplary look-up table, Table 1, which may be used to assign values to the SEE signal 142 and Foreground FG, Background BG, and selector SEL plane (layer) pixels.

The decision for switching the current pixels of the foreground and background planes to zeros may be based on the initial foreground/background current pixel values as well as the neighborhood information of these current pixels. Also, as noted above, the SEE signal 142 values can range from 0 to n (instead of just four values 0 to 3, as in the prior art). In an embodiment, n is close to 10.

Table 1 shows a number of embodiments where the SEE signal 142 may be assigned a value of 0 to 10 based on the input SST signal 124, SEL or SPK signals 32 and 122, respectively, and the selector count in the Mark Edges module 58. In this example, a 3×3 window is used for processing the data/ signals. A notation of "--" in Table 1 of FIG. 7 indicates that no changes are made to the signal value (e.g., the new Foreground FG value may remain the same). A notation of "X" in Table 1 indicates that the signal value does not matter. That is, the value of that signal does not affect the assigned value (e.g., despite the value of the edge strength SST signal, as long as all other conditions are met the new values are assigned).

For example, in a case as shown in the fifth row of the Table, where the determined SST signal 124 and SEL signal 32 both have a value of 1, and the selector count SEL CNT 68 is determined to be within a range of and including 1 to 8 (i.e., [1,8]), the output SEE signal 142 is assigned a value of 4, the new Background BG value is assigned a value of 0 (zero), and the Foreground FG value remains the same. Additionally, the selector SEL value remains the same.

As another example, as shown in the eighth row, the SST signal may have a value of 0 (zero), the SEL signal a value of 1, and the selector count SEL is within the range of and including 5 to 8. The output SEE signal is assigned a value of 7. The new output selector SEL value could change based on certain conditions (e.g., as defined by the conditions below) of the initial foreground and background. The new Foreground FG and Background BG values are both assigned values according to the following conditions (each indicated as **1 in Table 1):

If an absolute difference between initial background and initial foreground pixels (i.e. a difference between the luminance channels of initial foreground and initial background layers and a difference between the chrominance channels of the initial background and initial foreground layers) is less than a threshold (e.g., BG_FG_DIFF_TH). A typical value could be between and including the values of 5 through 10, then the system checks to see if luminance pixels of the foreground plane are close to black or color shadow regions and less than a second threshold (e.g., FG_TH2). For example, a typical value for FG_TH2 could be 40. The thresholds BG_FG_DIFF_TH and FG_TH2 may be predetermined and BG_FG_DIFF_TH could have different values for the luminance and chrominance channels.

If yes, the new Background BG value is set to 0 (zero) (for all of the luminance and chrominance channels) and the selector value remains the same.

Otherwise, the new Foreground FG value is set to 0 (zero) (for all of the luminance and chrominance channels) and the selector pixel SEL is turned OFF.

As shown by this example, the comparison of the initial background and initial foreground (and their respective luminance and chrominance channels) in this disclosure can be used to change the background, foreground, or selector layer values (e.g., ON or OFF).

In yet another example, the SEE signal and new Foreground FG and Background BG values may be set according to alternate conditions, provided in row 10 of Table 1. If the SST signal and SEL signal both have a value of 0 (zero), and the selector count SEL CNT is within and including the range of 1 to 6, and if any three in row or column in a neighborhood of a 3×3 window are all 1 (ones), the SEE signal is set to 9. The new Foreground FG, Background BG, and selector SEL values are assigned according to the following conditions (each indicated as **2 in Table 1):

If initial background pixel is neither white nor black, then foreground pixels (for of the luminance and chrominance channels) are set to 0 (zero).

Else, if initial foreground luminance pixel is dark, i.e., less than a third threshold (e.g., FG_TH1), the selector pixel SEL is turned ON, and the background pixels are set to 0 (zero) (for all three channels). For example, in an embodiment, a typical value for FG_TH1 could be 50.

In an embodiment, switching the values of the Foreground FG and Background BG pixels to 0 can be replaced by setting the values equal to the neighboring pixel values, or, alternatively, an average of the neighboring pixel values. The newly assigned values may be determined based which result reduces the file size more, for example. Such determinations may be generally known in the art (e.g., see incorporated '802 patent).

To further reduce the file size, if the count of non-background pixels in the background plane is less than 10 percent (%) of the original image size, the output background plane can be sub-sampled to a larger value (instead of a 2×2 or 4×4 sub-sampling, as is typically the case). For example, using some background detection technique known in the art, the background value of the image will be detected first, for both luminance and chrominance channels. If the count of non-background pixels in the background plane is substantially small (e.g., in comparison to a preset threshold), the background plane can be sub-sampled using a substantially large sub-sampling value (such as 8×8 or 16×16, for example). Examples of such background techniques and/or algorithms that may be used include those described in U.S. Pat. Nos. 6,198,845; 6,674,899; and 7,058,222, which are each hereby incorporated by reference in their entirety.

In embodiments, Table 1 can also be replaced with a template matching technique. For example, for the case in row 9 in Table 1 it may be beneficial. Table 1 can also be extended to any size N×M window. Typical values for N may include 3×3, 3×5, or 5×5.

FIGS. 8-19 illustrate a plurality of digital images which are input as originals and output using the above-described method 600 and/or system 150. In some cases, the method 600 may be used in accordance with additional image data processing methods, such as, for example, the method disclosed in U.S. application Ser. No. 12/576,754, filed Oct. 9, 2009, entitled "Edge Detection for Mixed Raster Content (MRC) Images for Improved Compression and Image Quality," assigned to the same assignee.

Figures 8, 9:
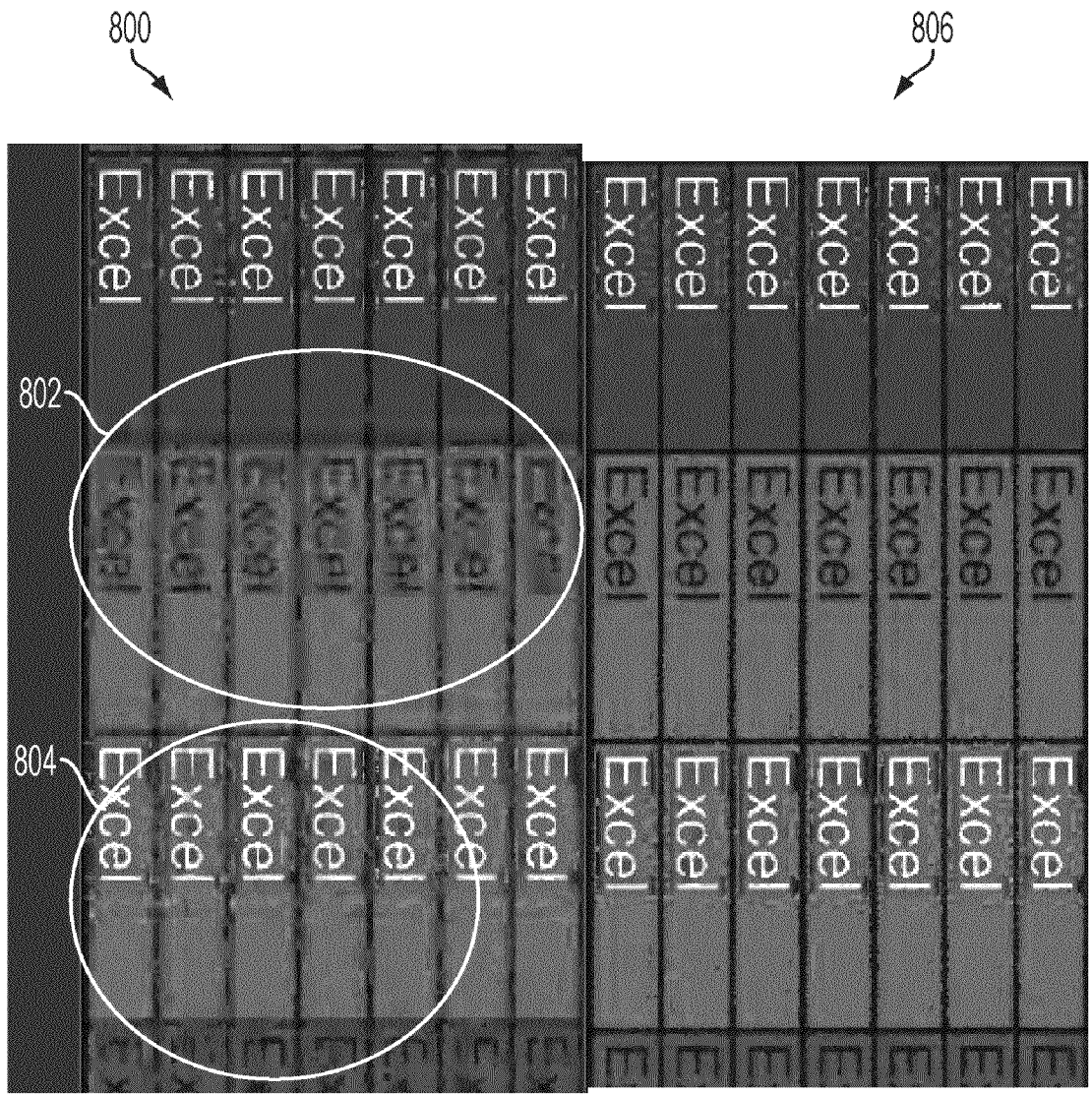
FIG. 8 illustrates an example of an MRC image that is output using a prior art method.
FIG. 9 illustrates an example of the same MRC image of FIG. 8 that is output when processed using the method of FIGS. 6A-6B, in accordance with an embodiment of the present disclosure.

FIG. 8 illustrates an example of an MRC image 800 that is output from an "Excel" input image using a prior art method. As shown by sections 802 and 804 in FIG. 8, the prior method may have a lower quality due to degraded pixels (e.g., ringing artifacts, low text quality) that are present after processing the original input image data. FIG. 9 illustrates an example of an MRC image 806 that is output from the same "Excel" input image, once processed using the method of FIGS. 6A-6B (as well as edge detection methods, as noted). As shown, such pixels may be eliminated and image quality improved. In FIG. 8, the sub-sampling factor for the foreground is 4, while in FIG. 9 the sub-sampling factor is 3. A smaller sub-sampling factor indicates better image quality for bigger file sizes. The file size for FIG. 8 is 151 kb (kilobytes), while the file size for FIG. 9 is 131 kb.

Figures 10, 11:
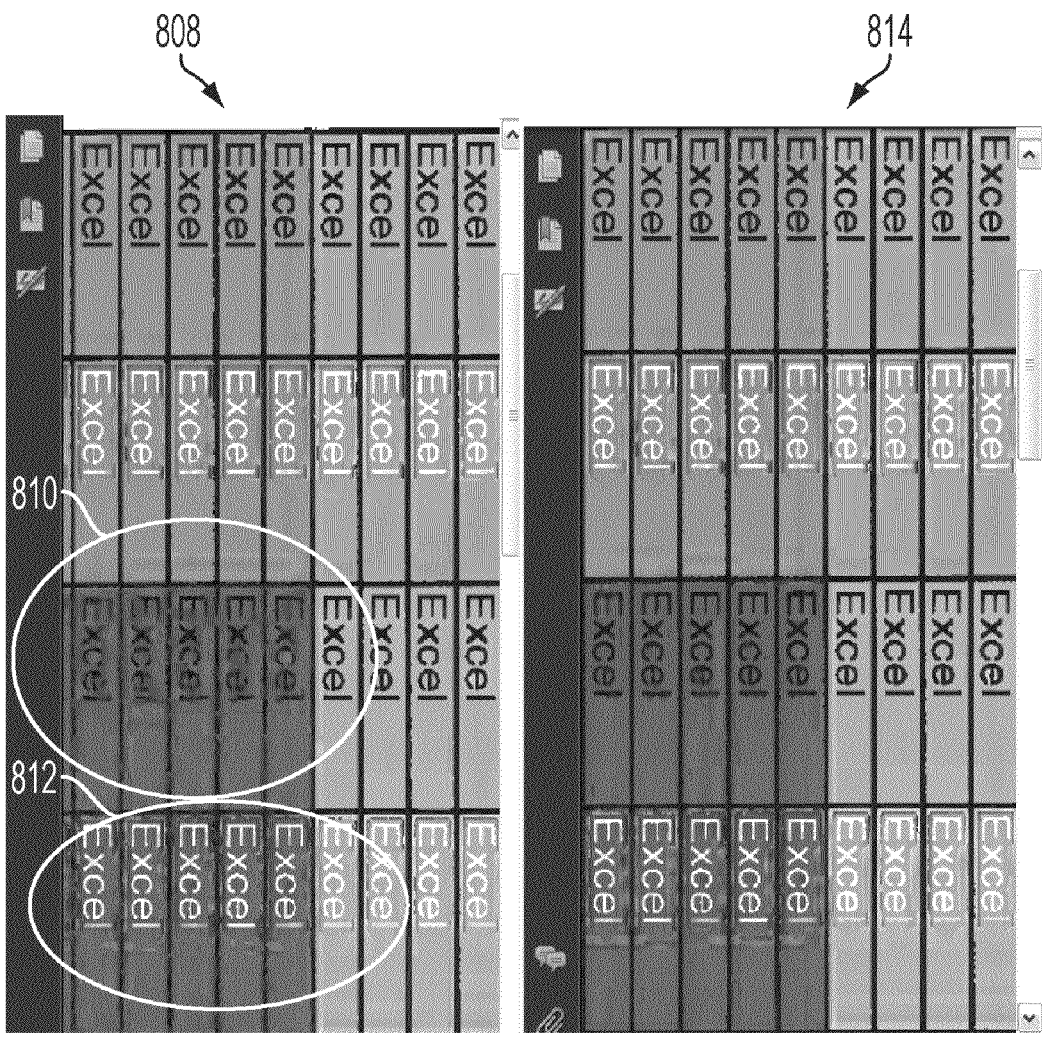
FIG. 10 illustrates an example of a second MRC image that is output using a prior art method.
FIG. 11 illustrates an example of the same MRC image of FIG. 10 that is output when processed using the method of FIGS. 6A-6B, in accordance with an embodiment of the present disclosure.

FIG. 10 illustrates an example of a second MRC image 808 that is output from an "Excel" input image using a prior art method. As shown by sections 810 and 812, the prior method may have a lower quality due to degraded pixels present after processing the original input image. FIG. 11 illustrates an example of an MRC image 814 that is output from the same "Excel" input image, when processed using the method of FIGS. 6A-6B (as well as edge detection methods, as noted). Again, such pixels may be eliminated and image quality improved. The sub-sampling factor for the background is 4 for both images. FIG. 10 has a file size of 151 kb after processing, while FIG. 11 has a file size of 124 kb.

Figures 12, 13, 14:
FIGS. 12, 13, and 14 illustrate examples of MRC images that are output when processed using the method of FIGS. 6A-6B, in accordance with an embodiment of the present disclosure.

FIGS. 12, 13, and 14 illustrate examples of MRC images 816, 818, and 814 that are output using the method of FIGS. 6A-6B in accordance with an embodiment of the present disclosure. In these images, the background plane is sub-sampled by a factor of 2 (FIG. 12), 3 (FIG. 13), and 4 (FIG. 14), respectively. The file sizes for FIGS. 12-14 are provided in Table 2 of FIG. 20.

Figures 15, 16:
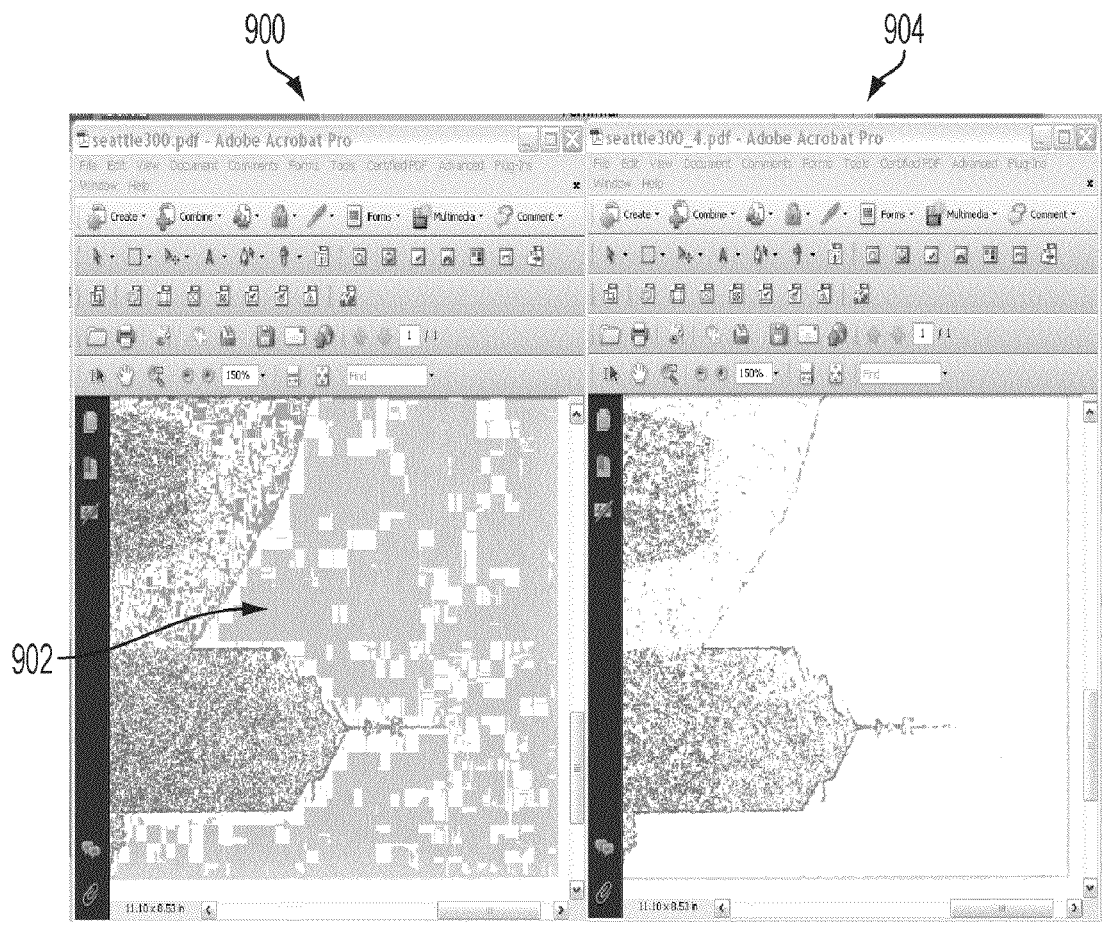
FIG. 15 illustrates an example of a foreground plane of an image that is processed using a prior art method.
FIG. 16 illustrates an example of the same foreground plane of the image of FIG. 15 that is processed using the method of FIGS. 6A-6B, in accordance with an embodiment of the present disclosure.

FIG. 15 illustrates an example of a foreground plane of an image 900 that is output from an input image "Seattle" that is processed using a prior art method. Section 902 indicates an area where there is a low image quality (e.g., resulting in a bigger file size) due to false edge detection in the foreground layer as a result of the prior method, which can be improved. FIG. 16 illustrates an example of an image 904 that is output from the same "Seattle" input image, when processed using the method of FIGS. 6A-6B (as well as edge detection methods, as noted) in accordance with an embodiment of the present disclosure. Areas with false edges such as section 902 are not present in FIG. 16, thus showing an improvement in the compression ratio of the image, and where overall image quality is not visibly effected and may be improved. Both FIGS. 15 and 16 are processed using a sub-sampling factor of 4. These false edges have been pushed to the background using the methods of FIGS. 6A-6B (as well as edge detection methods, as noted).

Figures 17, 18, 19:
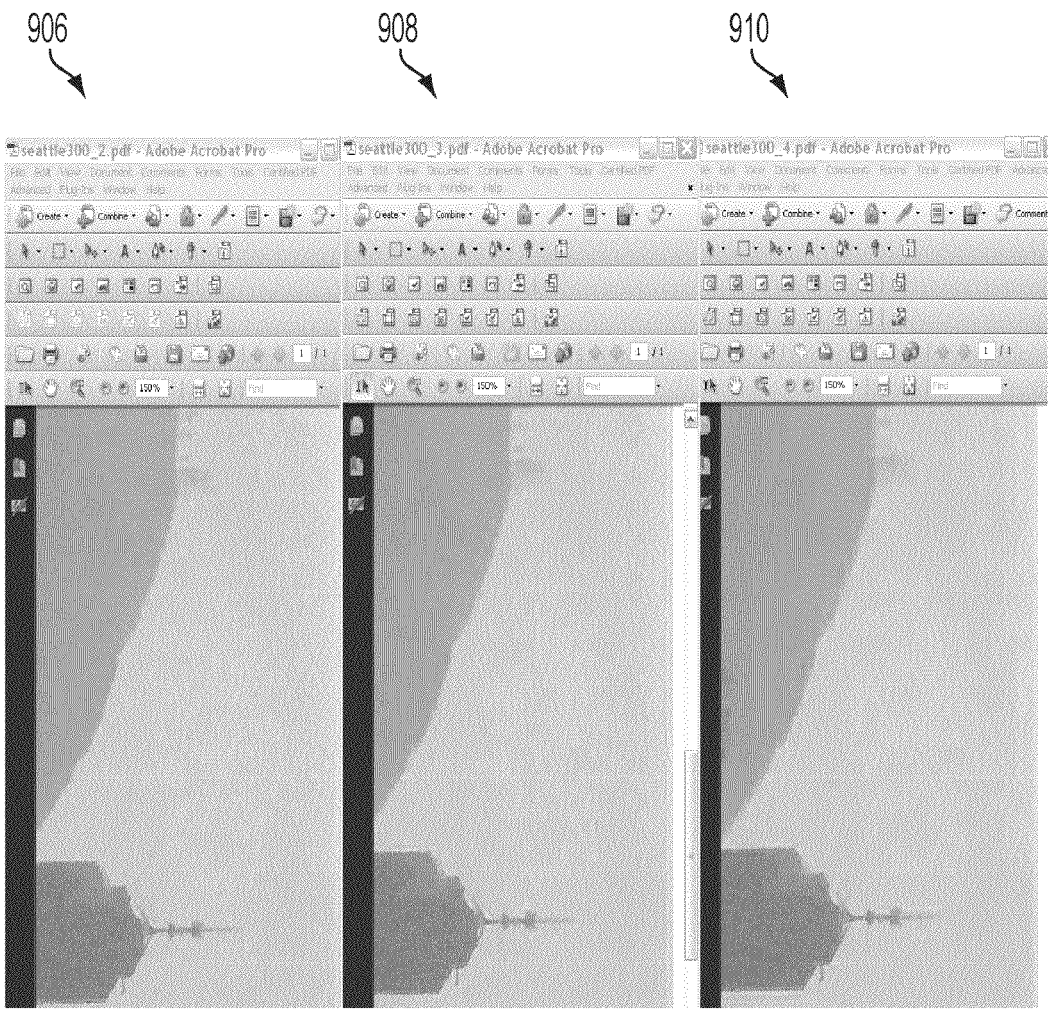
FIGS. 17, 18, and 19 illustrate examples of MRC images that are output using the method of FIGS. 6A-6B in accordance with an embodiment of the present disclosure.

FIGS. 17, 18, and 19 illustrate examples of images 906, 908, and 910 that are output using the method of FIGS. 6A-6B in accordance with an embodiment of the present disclosure. In these images, the background plane is sub-sampled by a factor of 2 (FIG. 17), 3 (FIG. 18), and 4 (FIG. 19), respectively. The file sizes for FIGS. 17-20 are provided in Table 2 of FIG. 20.

Table 2 of FIG. 20 shows a comparison between the file sizes of digital images output by a prior art three layer segmentor and the file sizes of digital images output in accordance with an embodiment of the present disclosure. As shown by the data in Table 2, the file size of the digital images output in accordance with an embodiment of the present disclosure is less than the file size of the digital images output by a prior art three layer segmentor. Depending on the background sub-sampling factor (e.g., 2, 3, or 4), the file sizes of the image data may be further reduced. Therefore, the method in accordance with an embodiment of the present disclosure not only improves the image quality of the digital images (e.g., as shown in FIGS. 9, 11, 12-14) but also reduces the file size of the output digital images (e.g., as shown in FIGS. 9, 11, 12-14, 16, 17-19) as compared to FIGS. 8, 10, and 15.

The MRC method or model chosen for separating a provided image data signal should not be limiting. The methods for detecting the layers in image data should not be limiting. For example, in embodiments, a 3-layer MRC model which uses a foreground, background, and mask layers may be used to obtain and separate the layers. In other embodiments, any other MRC model having selector, background, and foreground layers such as a 3+N layer MRC model as proposed in patent application Ser. No. 12/564,520, filed on Sep. 22, 2009 assigned to the same assignee (Xerox), may be used.

Also, it is to be understood that any number of windows may be established for analyzing the signals (e.g., image data signal, selector signal) and that the operations may be performed for each window in a set of windows for the pixel of interest in either the image data signal or selector signal.

The above described method thus is able to describe an efficient and effective way to compress and store MRC images such that upon output (e.g., viewing or printing) the images have improved text quality, background image quality, reduce ringing effects, and improved file size. This is particularly useful for storage in a memory or storage device.

Embodiments can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein, generally refers to software modules, hardware modules, or implementations thereof. Such modules can be utilized separately or together to form a program product that can be implemented. The concept of "modules" as used herein is notational, and is used only for purposes of clear explanation of the described method.

It should also be noted that each of the above devices or modules shown in system 150 may be connected to, incorporated in, or communicate with any of the other modules and/or modules not shown. The above noted devices or modules of system 150 may also be separate and distinct. Also, the system and method may be used in different applications such as, for example, devices capable of providing output via digital printing for a multitude of purposes, including, but not limited to, xerographic systems, laser printing systems, ink jet printing systems, digital copiers and/or scanners, bookmaking machines, facsimile machines, and multi-function machines or devices (MFD).

It should be appreciated that, in various exemplary embodiments, the system 150 and/or method 600 can be implemented as software executing on a programmed computer. Likewise, the system 150 may be implemented on a special purpose computer, a programmed microprocessor or microcontroller, integrated circuit elements, ASIC or other integrated circuit, a digital signal processor (DSP), hardwired electronic or logic circuits, a programmable logic device, such as a PLD, PLA, FPGA or PAL, or the like. In general, any device that is capable of implementing the functionality disclosed herein and in the incorporated '802 and '120 applications can be used to implement the three-layer image data generating system 150. Each of the various signal lines outlined above in FIGS. 3 and 4 connecting the various modules and the like can be direct signal line connections or can be software connections implemented using an implication programming interface or the like. It should be appreciated that any appropriate hardware, firmware or software elements or data structures can be used to implement one or more of the various modules and/or signal lines outlined above. Additionally, it is to be understood that the input and output of the modules or devices of system 150 may be in the form of signals.

The particular form the circuits, routines, applications, objects, procedures, managers and/or modules shown in FIGS. 3 and 4 take is a design choice and it will be obvious and predictable to those skilled in the art. It should be appreciated that the circuits, routines, applications, objects, procedures, managers and/or modules shown do not need to be of the same design.

It should be appreciated that a routine, an application, a manager, a procedure, an object, and/or a module, or the like, can be implemented as a self-consistent sequence of computerized steps that lead to a desired result. These steps can be defined by and/or in one or more computer instructions stored in a computer-readable medium, which should be understood to encompass using a carrier wave or the like to provide the software instructions to a processing device. These steps can be performed by a computer executing the instructions that define the steps. Thus, the terms "routine", "application", "manager", "procedure", "object" and/or "module" can refer to, for example, any appropriately-designed circuit, a sequence of instructions, a sequence of instructions organized with any programmed procedure or programmed function, and/or a sequence of instructions organized within programmed processes executing in one or more computers. Such routines, applications, managers, procedures, objects and/or modules, or the like, can also be implemented directly in circuitry that performs a procedure. Further, the data processing described with respect to FIGS. 3 and 4 can be performed by a computer executing one or more appropriate programs, by special purpose hardware designed to perform the method, or any combination of such hardware, firmware and software elements.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will be appreciated that variants of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A processor-implemented method for processing an image data signal, the method comprising the following acts implemented by one or more processors:
   segmenting the image data signal by:
   determining a control signal for a pixel of interest in the image signal;
   determining an edge signal based on the image data signal representing locations of edges in the image data signal;
   determining a selector signal for identifying one or more foreground attributes of the image data signal based on the control signal and the edge signal;
   determining an initial background layer signal representing background attributes of the image data signal and an initial foreground layer signal representing the foreground attributes of the image data signal based on the selector signal;
   establishing a window comprising a pixel of interest and neighboring pixels in the selector signal;
   determining a selector count based on a number of on and off pixels in the window;
   determining an edge strength signal based on the selector layer signal;
   producing a decision signal, the decision signal comprising a value that is chosen based on the following:
   if the pixel of interest is off and all neighboring pixels are on, switch the pixel of interest off and assign a first value to the decision signal;
   else, if the pixel of interest is on and all neighboring pixels are off, switch the pixel of interest off and assign a second value to the decision signal;
   else, if the pixel of interest is off and some but not all neighboring pixels are on, apply a transformation to select a first alternate value from a range based on the selector signal, edge strength signal, and the selector count, and assign the first alternate value to the decision signal;

else, if the pixel of interest is on and some but not all neighboring pixels are off, apply a transformation to select a second alternate value from the range based on the selector signal, edge strength signal, and the selector count, and assign the second alternate value to the decision signal;

determining undefined pixels in the initial foreground and background layers based on at least the image data signal and the decision signal; and outputting a final foreground signal and a final background signal, wherein a representation of the pixel of interest of the image data signal is included in at least one of the final foreground signal and the final background signal in accordance with the decision signal.

2. The processor-implemented method according to claim 1, further comprising the following acts implemented by the processor:

filling undefined pixels in the initial foreground and background signals with alternative values before outputting the final foreground signal and the final background signal.

3. The processor-implemented method according to claim 1, wherein the range includes the first and second values.

4. The processor-implemented method according to claim 1, wherein the first alternate and the second alternate values of the range are determined by using a look-up table or a template.

5. The processor-implemented method according to claim 2, wherein the alternative values are determined by using a look-up table or a template.

6. The processor-implemented method according to claim 1, wherein the operation of producing the decision signal further comprises:

comparing the initial foreground signal and the initial background signal to determine a value for the selector signal based on the following:

if an absolute difference between respective luminance and chrominance channels of the initial foreground and background signals is less than a predetermined threshold, and the initial foreground signal is less than a second predetermined threshold, assign a zero value to the background signal and allow the value for the selector signal to remain;

else, assign a zero value to the foreground signal and switch the value for the selector signal off.

7. The processor-implemented method according to claim 1, wherein the operation of producing the decision signal further comprises:

determining a value for the selector signal based on the following:

if the initial background signal is neither white nor black, then assign a zero value to the foreground signal and allow the value for the selector signal to remain;

else, if the initial foreground signal is less than a third predetermined threshold, assign a zero value to the background signal and switch the value for the selector signal on.

8. The processor-implemented method according to claim 1, wherein, when the processor performs the operation of segmenting the image data signal, the segmenting further comprises:

searching for a minimum and maximum within at least one window centered on the pixel of interest in the image data signal;

computing for at least one window, based on the minimum and the maximum and the pixel of interest, a respective indicator representing the distance and direction of the pixel of interest relative to a threshold plane and determining the control signal based on the indicator;

sub-sampling the image data signal into the initial background layer, the initial foreground layer, and the selector layer, and separating the image data signal into the final background layer, the final foreground layer, and the selector layer in accordance with the control signal and the decision signal by including a representation of the pixel of interest in at least one of the layers.

9. The processor-implemented method according to claim 8, wherein the image data signal comprises a luminance signal, a first chrominance signal and a second chrominance signal, and wherein operation of searching for the minimum and maximum comprises the operations of:

searching for a luminance minimum and a luminance maximum in the luminance signal within the at least one window;

indexing locations of the luminance maximum and luminance minimum within the at least one window; and outputting the luminance minimum, the luminance maximum, and values in the first and the second chrominance signals that correspond to the locations of the luminance minimum and luminance maximum.

10. The processor-implemented method according to claim 9, wherein the operations of searching, indexing and outputting are performed for each window in a set of windows for the pixel of interest in the image data signal.

11. The processor-implemented method according to claim 1, wherein the operations of determining a selector count, determining an edge strength signal, and producing a decision signal are performed for each window in a set of windows for the pixel of interest in the selector signal.

12. A system for processing an image data signal, the system comprising:

an input device for receiving the image data signal;

a processor configured to process the image data signal, the processor comprising a segmentation module comprising code executable by the processor for performing a method comprising:

segmenting the image data signal by:

determining a control signal for a pixel of interest in the image signal;

determining an edge signal based on the image data signal representing locations of edges in the image data signal;

determining a selector signal for identifying one or more foreground attributes of the image data signal based on the control signal and the edge strength signal;

determining an initial background layer signal representing background attributes of the image data signal and an initial foreground layer signal representing the foreground attributes of the image data signal based on the selector signal;

establishing a window comprising a pixel of interest and neighboring pixels in the selector signal;

determining a selector count based on a number of on and off pixels in the window;

determining an edge strength signal based on the selector layer signal;

producing a decision signal, the decision signal comprising a value that is chosen based on the following:

if the pixel of interest is off and all neighboring pixels are on, switch the pixel of interest off and assign a first value to the decision signal;

else, if the pixel of interest is on and all neighboring pixels are off, switch the pixel of interest off and assign a second value to the decision signal;

else, if the pixel of interest is off and some but not all neighboring pixels are on, apply a transformation to select a first alternate value from a range based on the selector signal, edge strength signal, and the selector count, and assign the first alternate value to the decision signal;

else, if the pixel of interest is on and some but not all neighboring pixels are off, apply a transformation to select a second alternate value from the range based on the selector signal, edge strength signal, and the selector count, and assign the second alternate value to the decision signal;

determining undefined pixels in the initial foreground and background layers based on at least the image data signal and the decision signal; and outputting a final foreground signal and a final background signal, wherein a representation of the pixel of interest of the image data signal is included in at least one of the final foreground signal and the final background signal in accordance with the decision signal.

13. The system according to claim 12, further comprising the following acts implemented by the processor:

filling undefined pixels in the initial foreground and background signals with alternative values before outputting a final foreground signal and a final background signal.

14. The system according to claim 12, wherein the range includes the first and second values.

15. The system according to claim 12, wherein the first alternate and the second alternate values of the range are determined by using a look-up table or a template.

16. The system according to claim 13, wherein the alternative values are determined by using a look-up table or a template.

17. The system according to claim 12, further comprising the following acts implemented by the processor when producing the decision signal:

comparing the initial foreground signal and the initial background signal to determine a value for the selector signal based on the following:

if an absolute difference between respective luminance and chrominance channels of the initial foreground and background signals is less than a predetermined threshold, and the initial foreground signal is less than a second predetermined threshold, assign a zero value to the background signal and allow the value for the selector signal to remain;

else, assign a zero value to the foreground signal and switch the value for the selector signal off.

18. The system according to claim 12, further comprising the following acts implemented by the processor when producing the decision signal:

determining a value for the selector signal based on the following:

if the initial background signal is neither white nor black, then assign a zero value to the foreground signal and allow the value for the selector signal to remain;

else, if the initial foreground signal is less than a third predetermined threshold, assign a zero value to the background signal and switch the value for the selector signal on.

19. The system according to claim 12, further comprising the following acts implemented by the processor when segmenting the image data signal:

searching for a minimum and maximum within at least one window centered on the pixel of interest in the image data signal;

computing for at least one window, based on the minimum and the maximum, a respective indicator representing the distance and direction of the pixel of interest relative to a threshold plane and determining the control signal based on the indicator;

sub-sampling the image data signal into the background layer, the foreground layer, and the selector layer, and separating the image data signal into the final background layer, the final foreground layer, and the selector layer in accordance with the control signal and the decision signal by including a representation of the pixel of interest in at least one of the layers.

20. The system according to claim 12, wherein the image data signal comprises a luminance signal, a first chrominance signal and a second chrominance signal, and wherein, when the processor forms the operation of searching for the minimum and maximum, the searching comprises the operations of:

searching for a luminance minimum and a luminance maximum in the luminance signal within the window;

indexing locations of the luminance maximum and luminance minimum within the window; and outputting the luminance minimum, the luminance maximum, and values in the first and the second chrominance signals that correspond to the locations of the luminance minimum and luminance maximum.

21. The system according to claim 12, wherein the processor performs the operations of searching, indexing and outputting for each window in a set of windows.

22. The system according to claim 12, wherein the processor performs the operations of determining a selector count, determining an edge strength signal, and producing a decision signal are performed for each window in a set of windows for the pixel of interest in the selector signal.

23. The system according to claim 12, further comprising:

an output device for outputting the processed image data signal.

24. A computer program product comprising: a non transitory computer-readable medium storing instructions that, when executed by a computer, cause the computer to perform a method comprising:

segmenting the image data signal by:

determining a control signal for a pixel of interest in the image signal;

determining an edge signal based on the image data signal representing locations of edges in the image data signal;

determining a selector signal for identifying one or more foreground attributes of the image data signal based on the control signal and the edge signal;

determining an initial background layer signal representing background attributes of the image data signal and an initial foreground layer signal representing the foreground attributes of the image data signal based on the selector signal;

establishing a window comprising a pixel of interest and neighboring pixels in the selector signal;

determining a selector count based on a number of on and off pixels in the window;

determining an edge strength signal based on the selector layer signal;

producing a decision signal, the decision signal comprising a value that is chosen based on the following:
- if the pixel of interest is off and all neighboring pixels are on, switch the pixel of interest off and assign a first value to the decision signal;
- else, if the pixel of interest is on and all neighboring pixels are off, switch the pixel of interest off and assign a second value to the decision signal;
- else, if the pixel of interest is off and some but not all neighboring pixels are on, apply a transformation to select a first alternate value from a range based on the selector signal, edge strength signal, and the selector count, and assign the first alternate value to the decision signal;
- else, if the pixel of interest is on and some but not all neighboring pixels are off, apply a transformation to select a second alternate value from the range based on the selector signal, edge strength signal, and the selector count, and assign the second alternate value to the decision signal;

determining undefined pixels in the initial foreground and background layers based on at least the image data signal and the decision signal; and outputting a final foreground signal and a final background signal, wherein a representation of the pixel of interest of the image data signal is included in at least one of the final foreground signal and the final background signal in accordance with the decision signal.

25. The computer program product according to claim 24, the method further comprising:
- receiving the initial foreground signal and the initial background signal;
- filling undefined pixels in the foreground and background signals with alternative values based on the background layer, foreground layer, and neighboring pixels; and
- outputting a final foreground signal and a final background signal.

26. The computer program product according to claim 24, wherein the range includes the first and second values.

27. The computer program product according to claim 24, wherein the first alternate and the second alternate values of the range are determined by using a look-up table or a template.

28. The computer program product according to claim 25, wherein the alternative values are determined by using a look-up table or a template.

29. The computer program product according to claim 24, wherein the operation of producing the decision signal further comprises:
- comparing the initial foreground signal and the initial background signal to determine a value for the selector signal based on the following:
  - if an absolute difference between respective luminance and chrominance channels of the initial foreground and background signals is less than a predetermined threshold, and the initial foreground signal is less than a second predetermined threshold, assign a zero value to the background signal and allow the value for the selector signal to remain;
  - else, assign a zero value to the foreground signal and switch the value for the selector signal off.

30. The computer program product according to claim 24, wherein the operation of producing the decision signal further comprises:
- determining a value for the selector signal based on the following:
  - if the initial background signal is neither white nor black, then assign a zero value to the foreground signal and allow the value for the selector signal to remain;
  - else, if the initial foreground signal is less than a third predetermined threshold, assign a zero value to the background signal and switch the value for the selector signal on.

31. The computer program product according to claim 24, wherein the segmenting further comprises:
- searching for a minimum and maximum within at least one window centered on the pixel of interest in the image data signal;
- computing for at least one window, based on the minimum and the maximum and the pixel of interest, a respective indicator representing the distance and direction of the pixel of interest relative to a threshold plane and determining the control signal based on the indicator;
- sub-sampling the image data signal into the initial background layer, the initial foreground layer, and the selector layer, and
- separating the image data signal into the final background layer, the final foreground layer, and the selector layer in accordance with the control signal by including a representation of the pixel of interest in at least one of the layers.

32. The computer program product according to claim 24, wherein the image data signal comprises a luminance signal, a first chrominance signal and a second chrominance signal, and wherein operation of searching for the minimum and maximum comprises the operations of:
- searching for a luminance minimum and a luminance maximum in the luminance signal within the window;
- indexing locations of the luminance maximum and luminance minimum within the window; and
- outputting the luminance minimum, the luminance maximum, and values in the first and the second chrominance signals that correspond to the locations of the luminance minimum and luminance maximum.

33. The computer program product according to claim 32, wherein the operations of searching, indexing and outputting are performed for each window in a set of windows.

34. The computer program product according to claim 24, wherein the operations of determining a selector count, determining an edge strength signal, and producing a decision signal are performed for each window in a set of windows for the pixel of interest in the selector signal.

* * * * *